(12) United States Patent
Cappelletti

(10) Patent No.: US 8,651,870 B2
(45) Date of Patent: Feb. 18, 2014

(54) APPARATUS, SYSTEM AND METHOD FOR TEACHING CARD COUNTING SYSTEMS

(76) Inventor: Will Cappelletti, Newburgh, NY (US)

( * ) Notice: Subject to any disclaimer, the term of this patent is extended or adjusted under 35 U.S.C. 154(b) by 301 days.

(21) Appl. No.: 13/020,342

(22) Filed: Feb. 3, 2011

(65) Prior Publication Data

US 2012/0202178 A1   Aug. 9, 2012

(51) Int. Cl.
*G09B 19/22* (2006.01)

(52) U.S. Cl.
USPC .......................................... 434/129

(58) Field of Classification Search
USPC ....... 434/129; 273/148 R, 292, 293, 302, 304
See application file for complete search history.

(56) References Cited

U.S. PATENT DOCUMENTS

| | | | | |
|---|---|---|---|---|
| 4,014,549 A | * | 3/1977 | Cywar | 273/304 |
| 4,266,770 A | * | 5/1981 | Yeager | 273/148 R |
| 4,778,183 A | * | 10/1988 | Luisi | 273/148 R |
| 5,100,326 A | * | 3/1992 | Leep et al. | 434/129 |
| 5,374,061 A | * | 12/1994 | Albrecht | 273/149 R |
| 5,628,511 A | * | 5/1997 | Jacoby | 273/148 R |
| 5,632,489 A | * | 5/1997 | Rozzi et al. | 273/304 |
| 5,769,417 A | * | 6/1998 | Richer et al. | 273/148 R |
| 5,895,048 A | * | 4/1999 | Smith, Jr. | 273/293 |
| 6,131,906 A | * | 10/2000 | Green | 273/148 R |
| 6,910,893 B2 | * | 6/2005 | Dillhoff | 434/129 |
| 2006/0043680 A1 | * | 3/2006 | Gray et al. | 273/292 |
| 2008/0315526 A1 | * | 12/2008 | Cottingham | 273/304 |

OTHER PUBLICATIONS

Ronald Perry, "Master 21: How to Play Winning BlackJack", 2010 (Amazon listing) [retrieved online Jan. 10, 2013].*
"Master 21 Card Counting Practice Deck", 2010. [retrieved online Jun. 11, 2013].*

* cited by examiner

*Primary Examiner* — Kurt Fernstrom
(74) *Attorney, Agent, or Firm* — The Law Offices of Anthony L. Meola

(57) ABSTRACT

An apparatus, system and method for teaching one of a plurality card counting systems in order to improve a player's chance of predicting favorable positions in connection with hands in the card game blackjack. A deck of cards is included with predetermined values attributed to the various cards to be used in teaching the various card counting systems in connection with blackjack.

13 Claims, 46 Drawing Sheets

APPARATUS, SYSTEM AND METHOD FOR TEACHING CARD COUNTING SYSTEMS

BACKGROUND OF THE INVENTION

1. The Field of the Present Invention

The present invention is generally related to a system, method and apparatus for teaching a card game and more specifically, to teaching a method for counting cards in the game of Blackjack.

2. General Background

Blackjack, also known as Twenty-one, is a comparing-type card game which is the most widely played casino banking game in the world. The standard game is played with one or more French decks of 52 cards.

The primary deck of fifty-two playing cards in use today includes thirteen ranks of each of the four French suits, clubs (♣), diamonds (♦), hearts (♥) and spades (♠), with reversible Rouennais "court" or face cards. Each suit includes an ace, depicting a single symbol of its suit; a king, queen, and jack, each depicted with a symbol of their suit; and ranks two through ten, with each card depicting that number of symbols (pips) of its suit. As well as these fifty-two cards, commercial decks often include two jokers which are removed in preparation for most popular games. The jokers are usually distinguishable by colour. Modern playing cards carry index labels on opposite corners to facilitate identification of the cards when they overlap and so that they appear identical for players on opposite sides. These stylings, together with the popular imagery on the court cards are labeled as "English" or "Anglo-American" and are the most popular forms of the French deck, especially in countries that speak English. Various alternative stylings include indices at all four corners, court indices in different languages, different court imagery or perhaps novelty stylings, but it should be noted that in all these cases, they are still indeed French decks.

In the game of Blackjack, the player draws cards to an initial two card hand with the object of bringing the total hand value as close as possible to 21 without exceeding it, so that the house, which plays after the player, will fail to get up to the player's total, or will lose by exceeding 21. Blackjack is played in many variations at casinos with different table rules. Much of blackjack's popularity is due to the mix of chance, skill, and the publicity that surrounds card counting, which entails adapting one's wager and playing strategy to the profile of cards yet to be dealt.

The players' object is to win money by getting a card total which will turn out to be higher than the dealer's hand, but without exceeding 21 ("busting"/"breaking"), and taking advantage of certain opportunities which arise within the play to increase the wager. Each hand is played by choosing whether to "hit" (take a card), "stand" (pass), "double" (double wager, take a single card and pass), "split" (make two hands out of a pair) or "surrender" (give up a half bet and retire from the game). Number-cards count as their natural value; the jack, queen, and king (also known as "face cards" or "pictures") count as 10; aces are valued as either 1 or 11 according to the player's best interest. If the hand value exceeds 21 points, it busts, and its bet is immediately forfeit. After all boxes have finished playing, the dealer's hand is resolved by drawing cards until the hand busts or achieves a value of 17 or higher (a dealer total of 7 including an ace, or "soft 17", must be drawn to in some games). The dealer never doubles, splits or surrenders. If the dealer busts, all remaining bets win and are paid out at 1:1. If the dealer does not bust, each remaining bet wins if its hand is higher than the dealer's, and loses if it is lower. In the case of a tied score, known as "push" or "standoff", the bet is normally returned without adjustment.

The best possible hand is a "blackjack" or "natural", which is an ace and a ten-value card in either order on the initial two cards (not after a split). A blackjack beats any hand which is not a blackjack, even those with value 21. Blackjack vs. blackjack is a push. When the dealer's upcard is an ace, the player is usually allowed to make a side bet called "insurance," of up to half his wager, which pays 2:1 if the dealer gets a blackjack, and is forfeited otherwise.

Card Counting

The basis of card counting is to keep track of every single card dealt, so a bettor can adjust his/her betting pattern to fit how your particular blackjack shoe is going.

Most card counting systems start with a count of 0. This means that when you first sit down at a blackjack table, the count is 0. Depending on which counting system you are using, this count will fluctuate with every card that is dealt. You must keep track of not only the cards that you are being dealt, but every single card dealt to every player and to the dealer.

With most card counting systems you are looking for a positive count. When the card count is positive, this generally means there have been more smaller cards played and the deck now has a higher percentage of larger cards. When the deck has a high percentage of larger cards, the player has several different advantages:

1. The dealer will bust more often;
2. The player will be dealt more blackjack; and
3. The player will be dealt stronger and higher starting hands.

When a card count is high, the player bets larger amounts of money because they have a higher mathematical advantage. The card counting doesn't stop here, though. Even when the player is betting more and winning more, the player still must focus and continue to count cards flawlessly. Once the high count starts to drop and gets either neutral or into the negative, the player goes back to betting smaller amounts because the casino now has the higher advantage.

Card Counting Systems

Blackjack card counting is a mathematical system of keeping track of every card dealt from a blackjack deck to better understand which cards are still left in the deck to be played. There are numerous card counting systems in use today that attempt to teach a player how to count cards for increased success at Blackjack. Each of the card counting systems requires that a player learn the system before putting such system to use in a casino at a blackjack table.

The only way to become a skilled card counter is to practice the system that a player intends to be implemented in the casino. The learning process can take several months if not several years to truly master several of the card counting systems described below. A player needs to be constantly practicing specific card counting techniques and skills until the player can count flawlessly.

One prior art method of practicing card counting is to create practice counting charts. You player can create a chart that show the hand being played hand and the dealer's up card, then the player can verbally or mentally recite the proper play. If the player is stumped, the player can refer to the basic strategy charts. The drawback is that such charts are no allowed into casinos.

What is needed is simple system, method and apparatus for teaching card counting systems.

SUMMARY OF THE INVENTION

We have discovered an apparatus, system and method of teaching various card counting systems to a player using a single deck with multiple card value options in order to improve the player's chance of winning at blackjack. In particular the invention includes a set of cards having values placed thereon. There are multiple sets of cards provided to account for the numerous card counting systems that can be learned.

In a first aspect the present invention includes a method for teaching a card game, including providing a deck of cards wherein each of said cards has a predetermined numerical value located proximal to a rank and a suit of each card; calculating the combination of said predetermined numerical values as each card is dealt; and calculating a master sum value of cards pulled in order to identify a predetermined criteria based opportunity in order to maximize a player's chance of a favorable outcome for the card game.

The method may also include the step of repeating the calculations steps as necessary. The method may also include the step of selecting a predetermined card counting system. The method may also include where the predetermined numerical values for each card are selected according to the selected card counting system. The method may also include the step of wherein a player is required to make a wager before being dealt a card. The method may also include the step of wherein a player is required to make a wager after being dealt a card. The method may also include wherein the predetermined criteria comprises a predetermined successful outcome on at least one hand. The method may also include wherein the predetermined criteria comprises a predetermined unsuccessful outcome on at least one hand. The method may also include wherein the predetermined criteria comprises an amount wagered by a player. The method may also include wherein the predetermined criteria comprises an additional payment by at least one player. The method may also include wherein the predetermined criteria comprises at least some information from an unrelated game. The method may also include wherein the predetermined criteria where the predetermined values are minus 3, minus, 2 minus 1, zero, plus 0.5, plus 1, plus 2, plus 3 or plus 4. The method may also include wherein the predetermined criteria comprises either a predetermined unsuccessful or successful outcome in at least one game.

In a second aspect the present invention includes a system for teaching card counting, the system including a set of playing cards where each card has a predetermined value, the predetermined values based upon a selected card counting system; where each card includes the predetermined value visually displayed in at least one form of alphanumeric characters or numbers; and where each the predetermined value is visually displayed proximal to the suit and rank of each. The system may also include where the predetermined values are selected from the group consisting of minus 3, minus, 2 minus 1, zero, plus 0.5, plus 1, plus 2, plus 3 and plus 4. The system may also include where the cards are substantially rectangular. The system may also include where each the predetermined value is visually displayed in at least two opposite corners of the card. The system may also include where each the predetermined value is displayed right side up on each short side of the rectangular playing card such that when a player viewing such card in a standard card playing position, the predetermined value can always be read right side up.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE PREFERRED EMBODIMENTS

The present disclosure will now be described more fully with reference to the Figures in which an embodiment of the present disclosure is shown. The subject matter of this disclosure may, however, be embodied in many different forms and should not be construed as being limited to the embodiments set forth herein.

There are many card counting systems in use today. The most common systems are detailed in Chart 1 attached to this specification. Chart 1 is cross referenced with the drawings to show the respective values of the cards relative to the specific card counting system to be taught. Players can use Chart 1 to determine which set or sets of card apply to a particular card counting strategy desired to be learned.

Referring now to the Figures there are shown various predetermined values located on each of the various cards included in the teaching system of the present invention in connection with various card counting systems which can be learned are as follows:

The Canfield Expert

Canfield Expert is a simple, Level 1, balanced card counting strategy optimized for Playing Efficiency. Few people use this strategy today as it was designed for single deck.

The Canfield Master

Canfield Master is a proprietary, advanced, Level 2, balanced Blackjack strategy available from Canfield Associates since the mid-70's. This is a precursor to Carlson's Omega II with the same tag values. Side counts were suggested making this system quite difficult. Few people use this strategy today as it was designed for single deck and is no longer viable for casino play.

The Hi-Lo Count

Figure 1A:
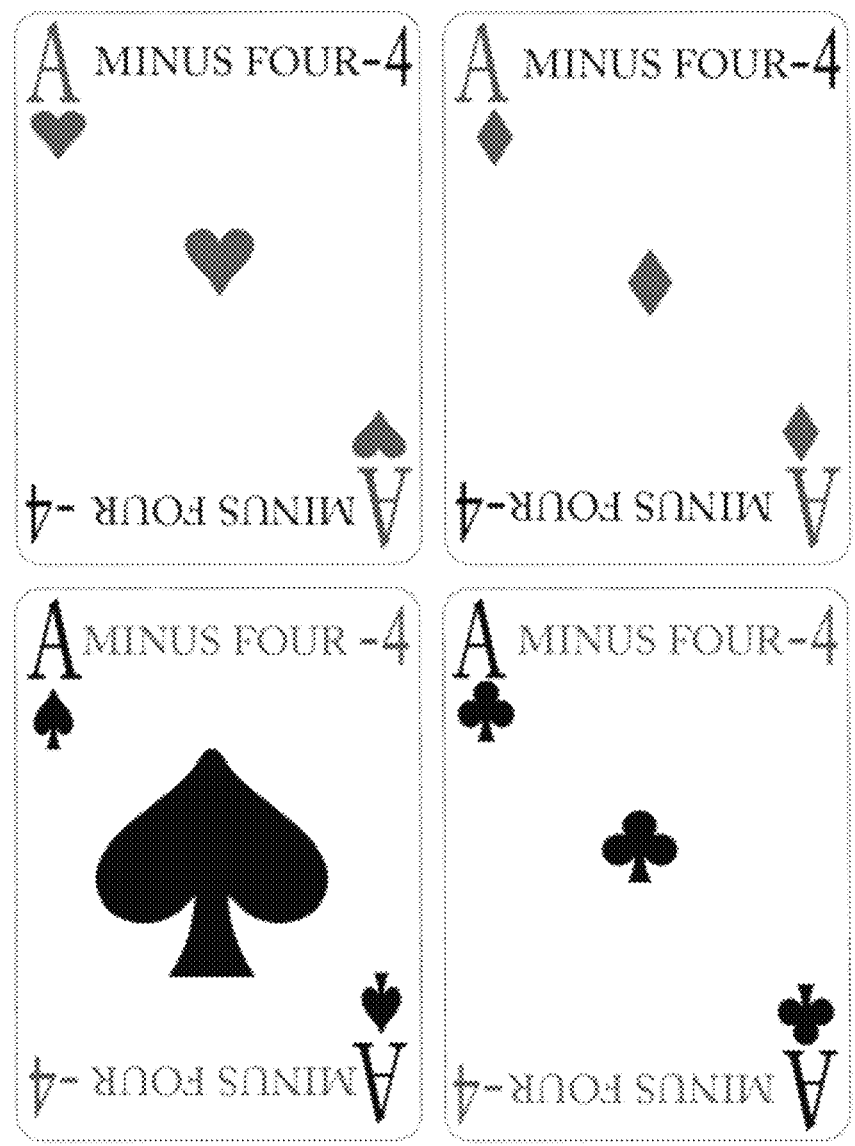
FIGS. 1A-1D shows the ace cards with varying values according to one embodiment of the present invention.
Figure 1B:
Figure 1C:
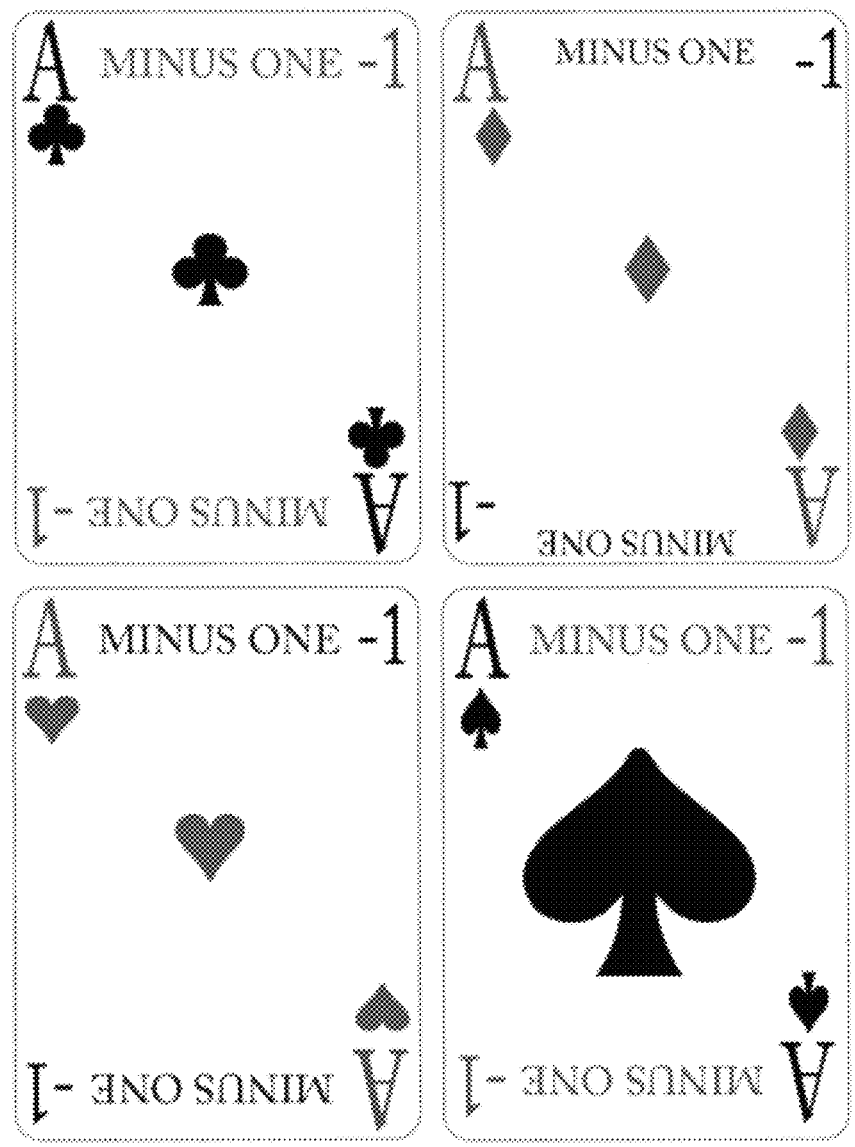
Figure 1D:
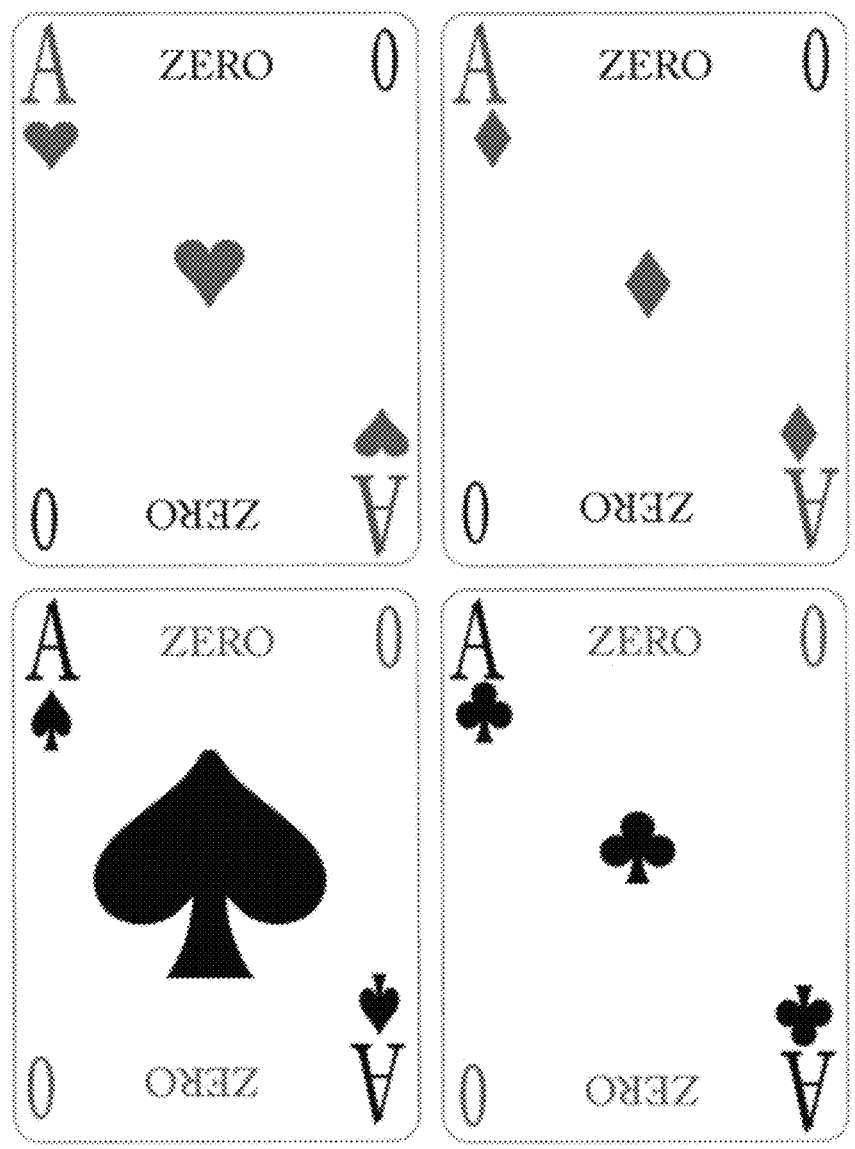
Figure 2A:
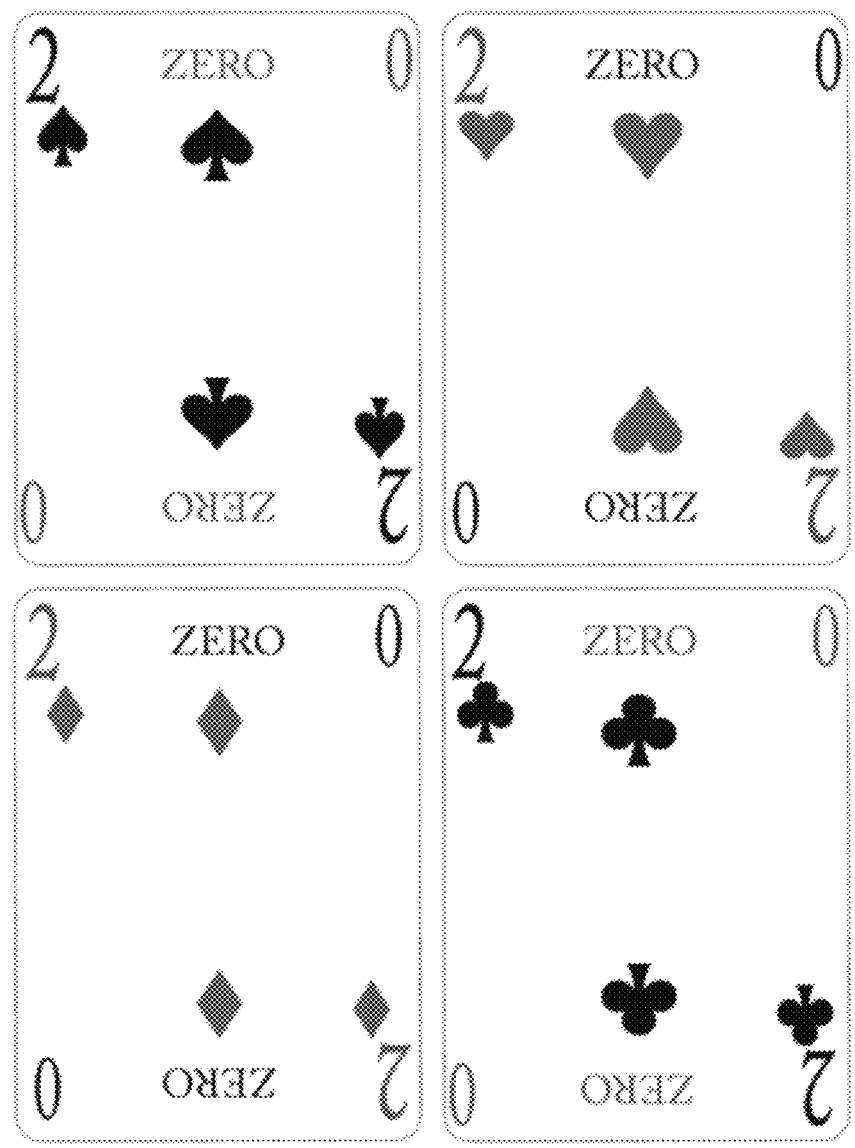
FIGS. 2A-2E shows the 2 cards with varying values according to one embodiment of the present invention.
Figure 2B:
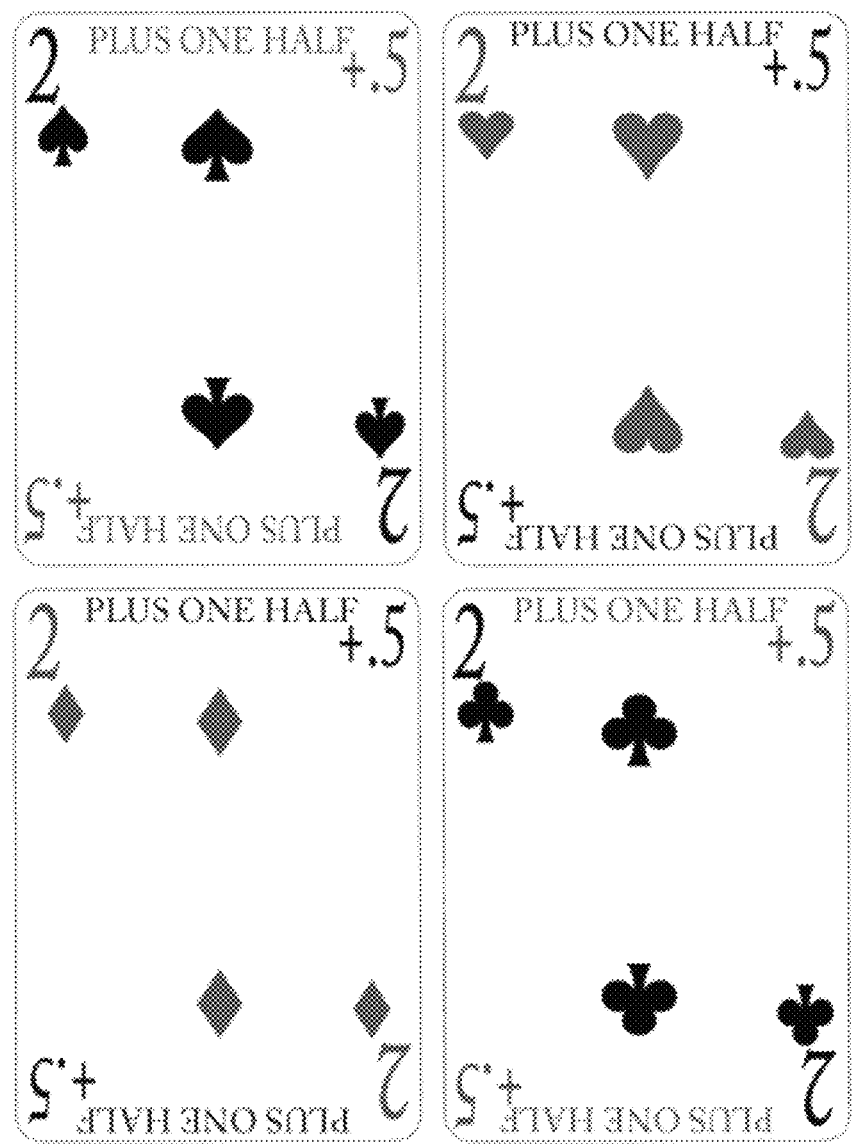
Figure 2C:
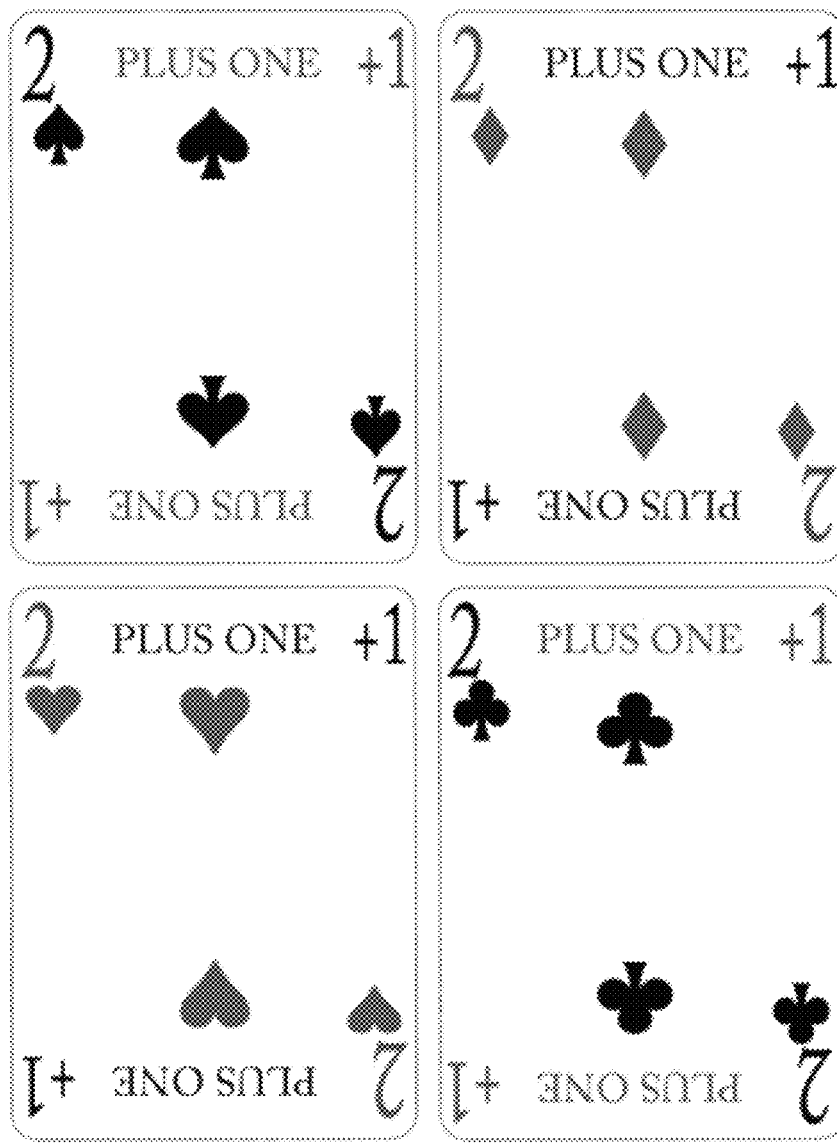
Figure 2D:
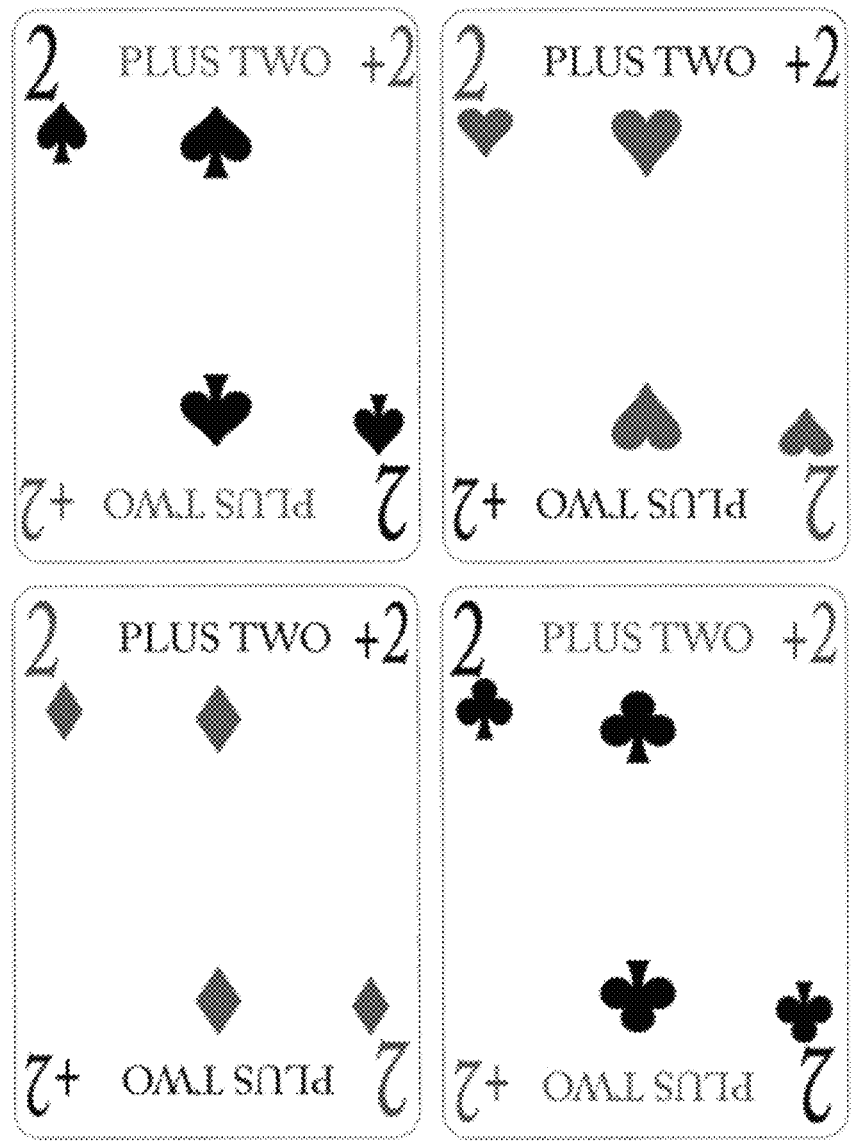
Figure 2E:
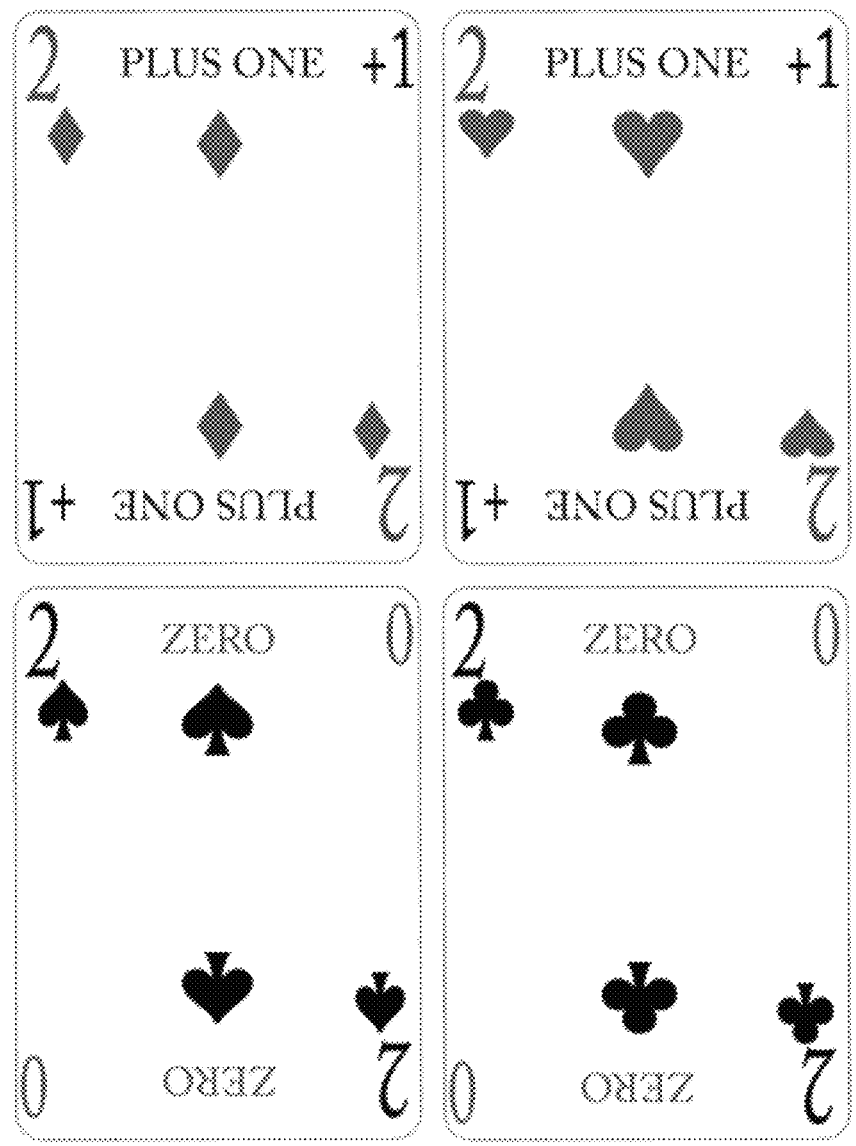
Figure 3A:
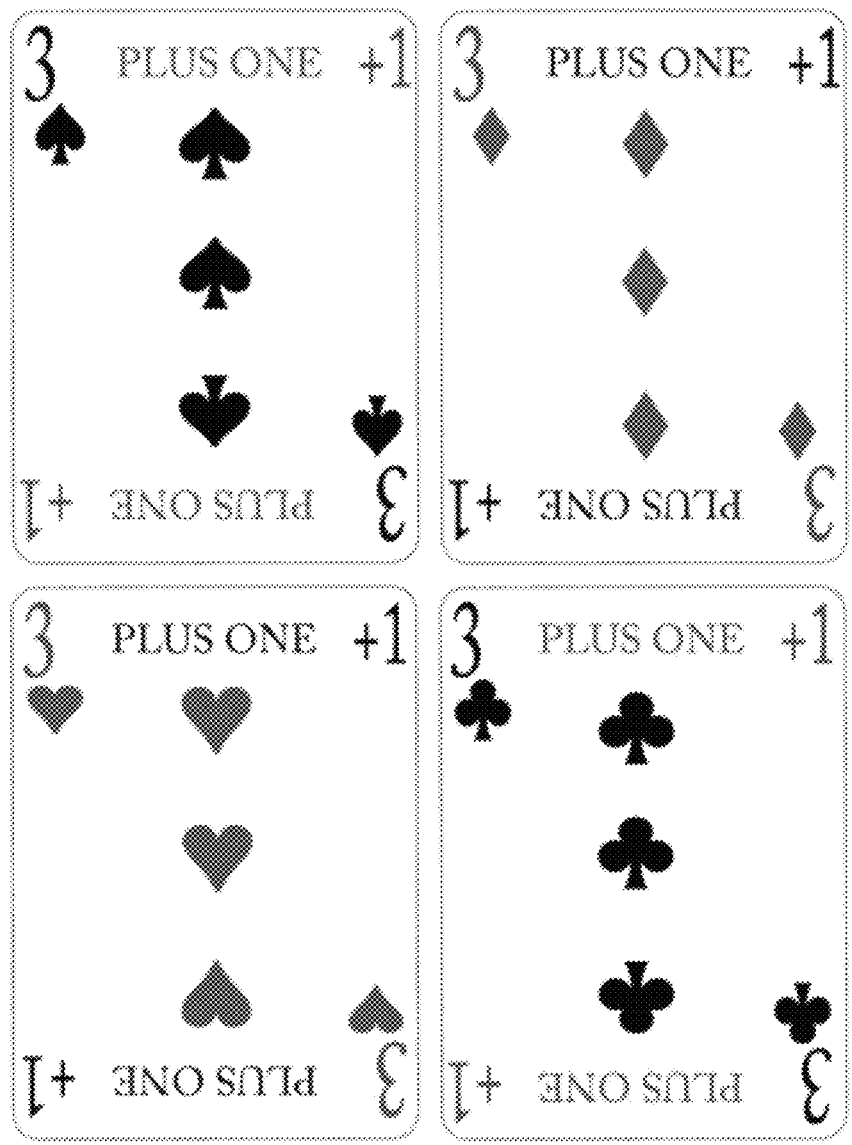
FIGS. 3A-3C shows the 3 cards with varying values according to one embodiment of the present invention.
Figure 3B:
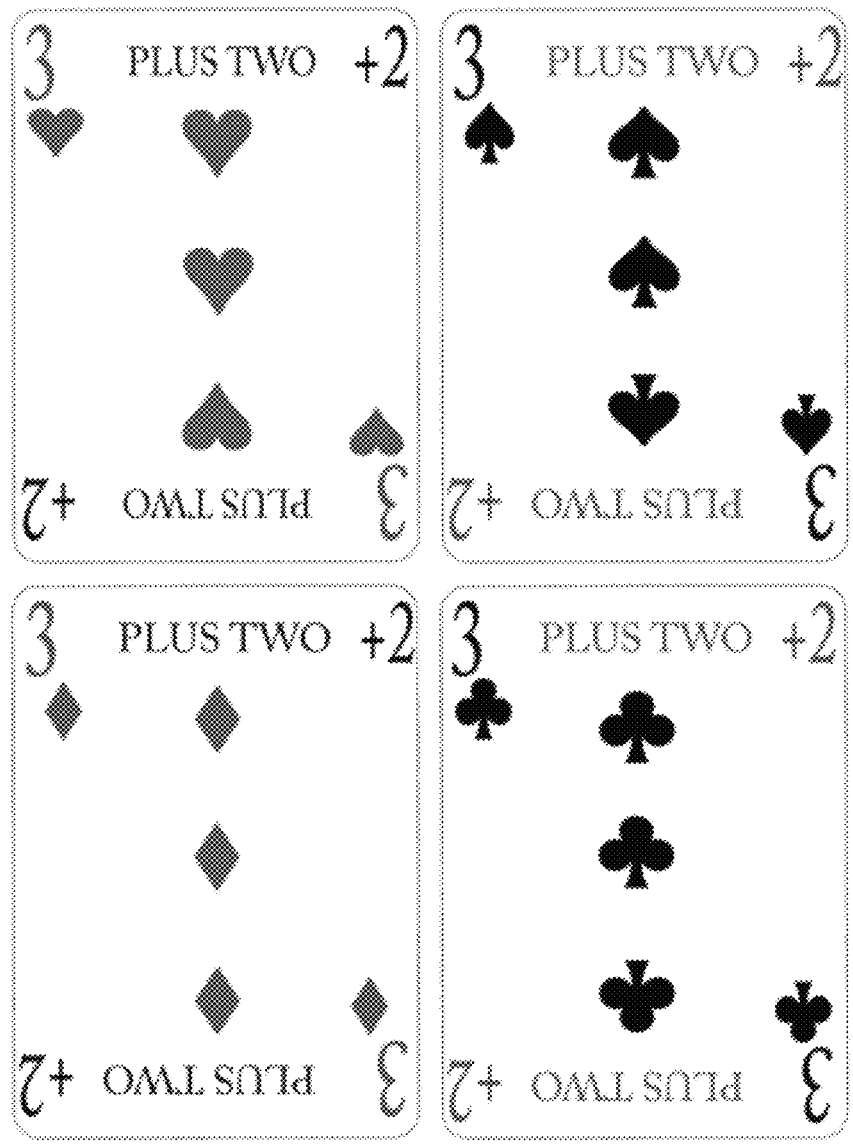
Figure 3C:
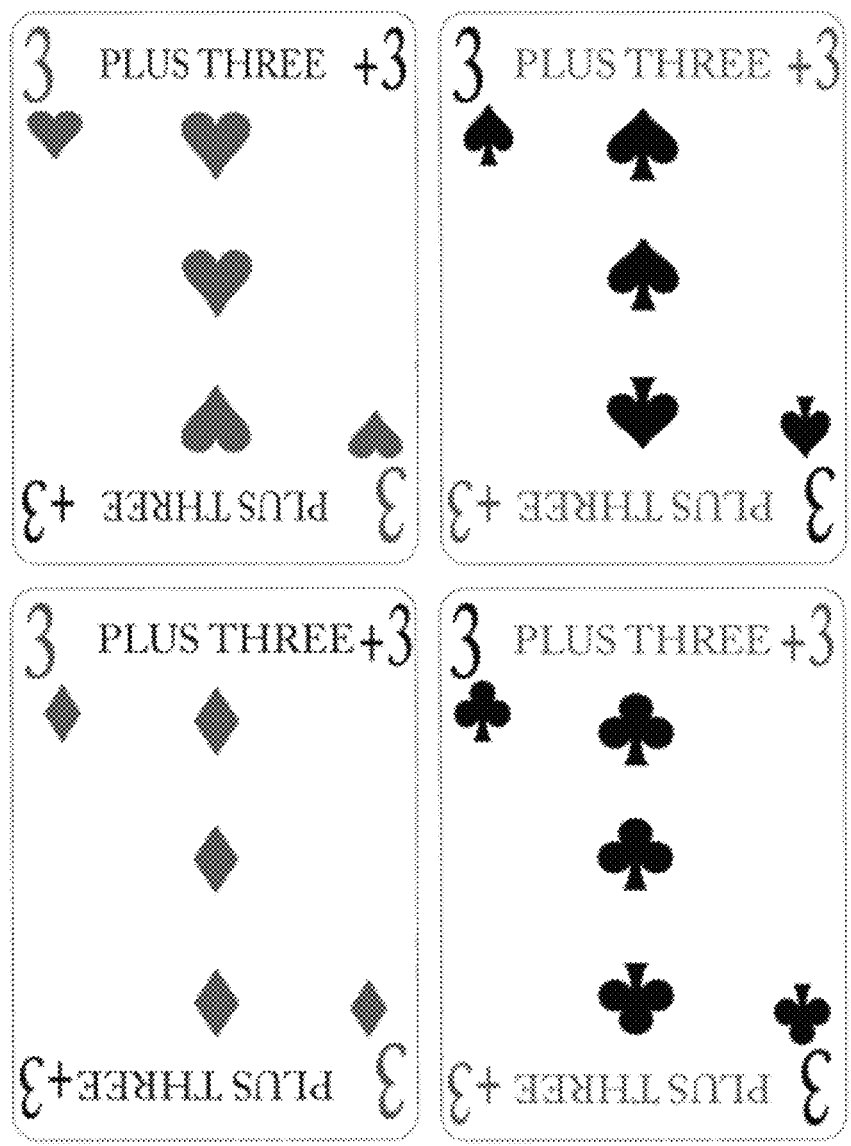
Figure 7A:
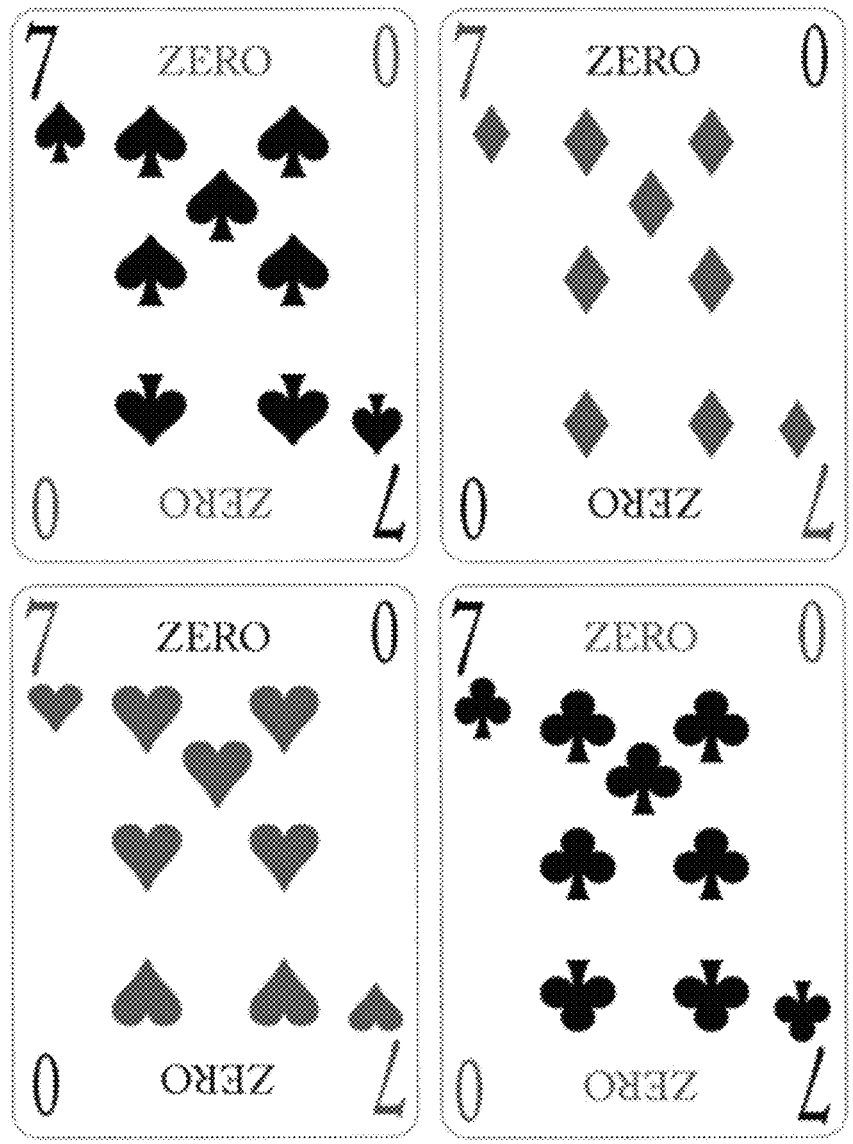
FIGS. 7A-7E shows the 7 cards with varying values according to one embodiment of the present invention.
Figure 8A:
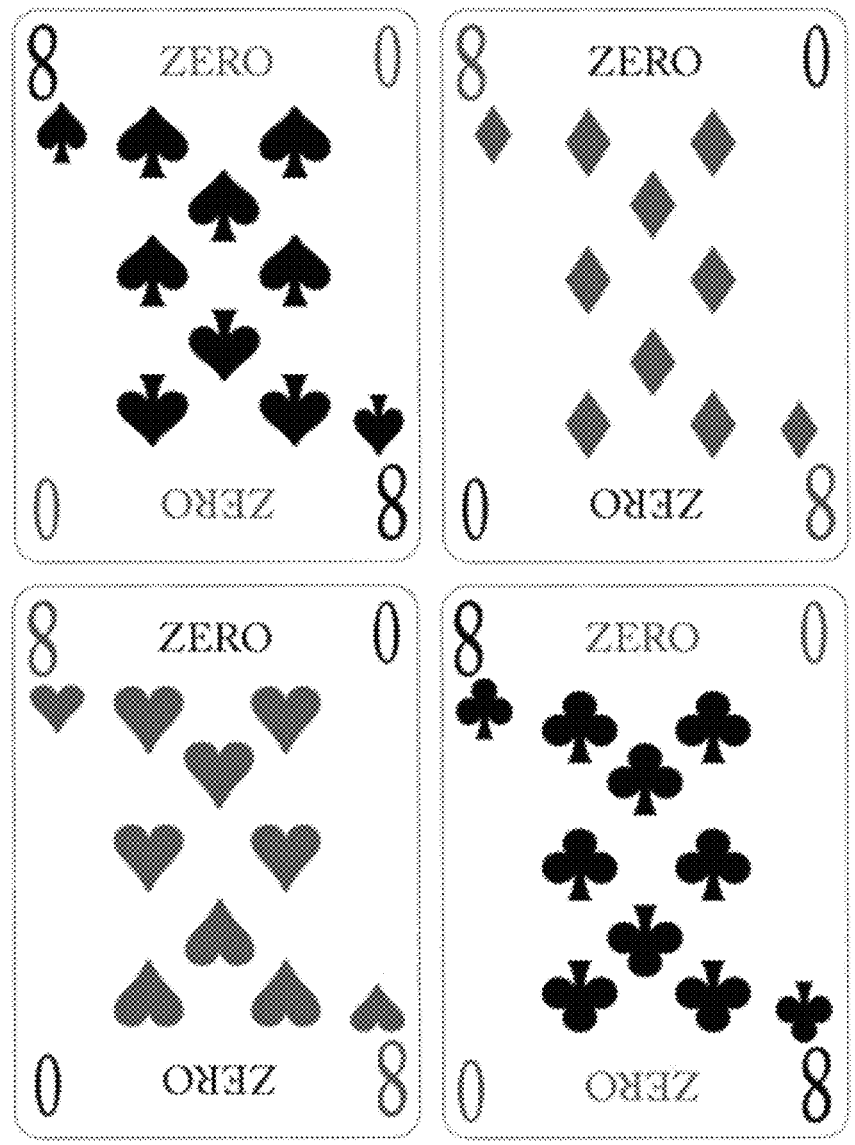
FIGS. 8A-8B shows the 8 cards with varying values according to one embodiment of the present invention.
Figure 8B:
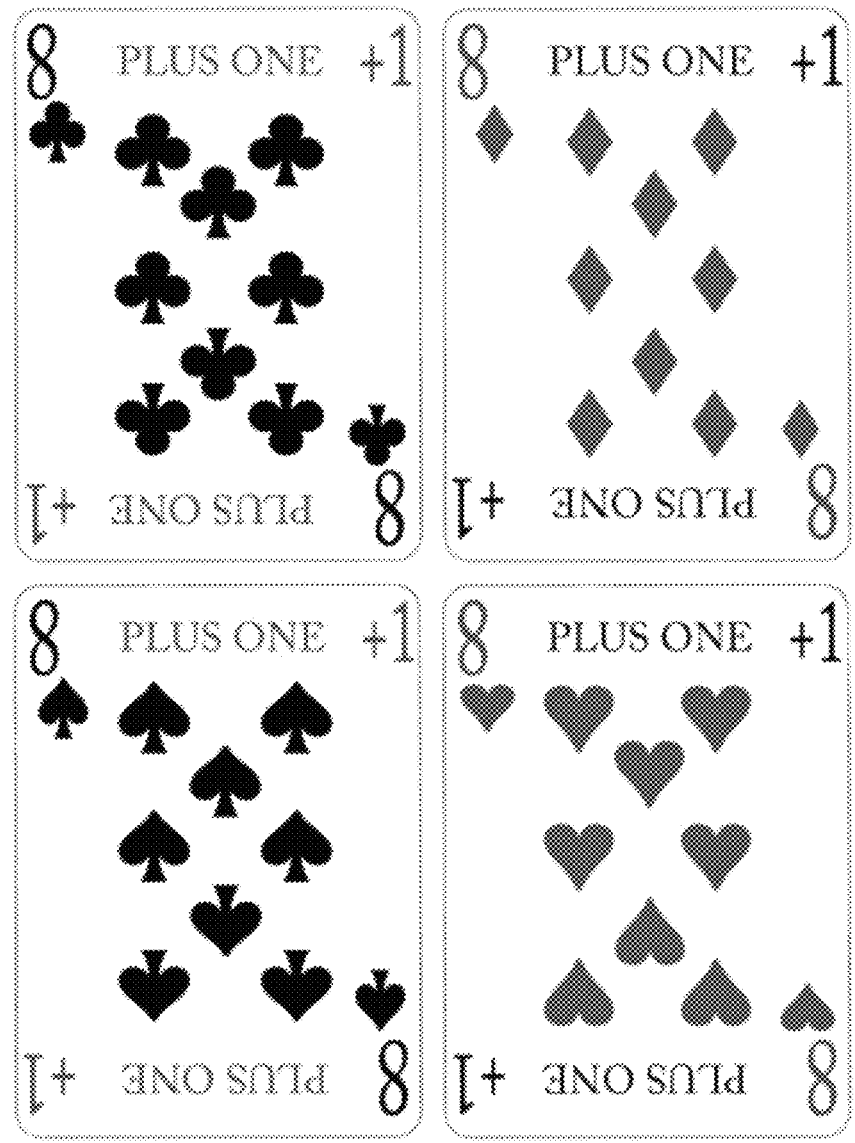
Figure 9A:
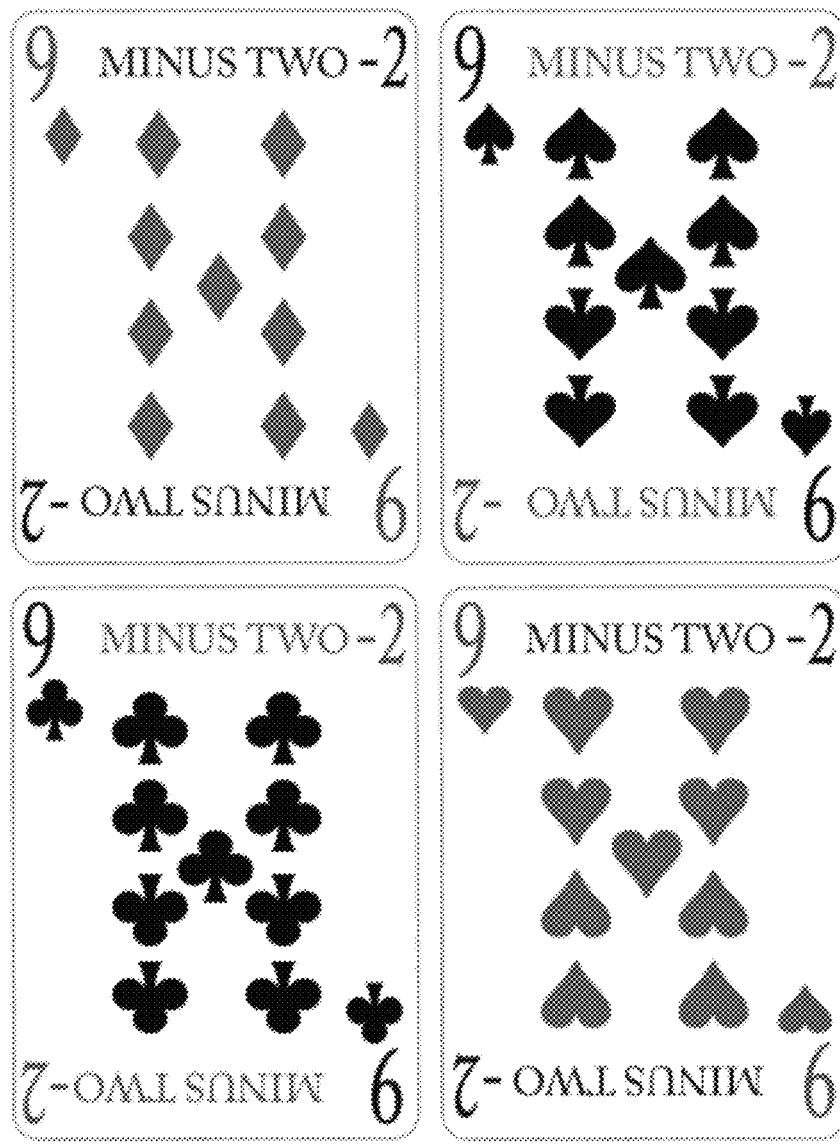
FIGS. 9A-9D shows the 9 cards with varying values according to one embodiment of the present invention.
Figure 9B:
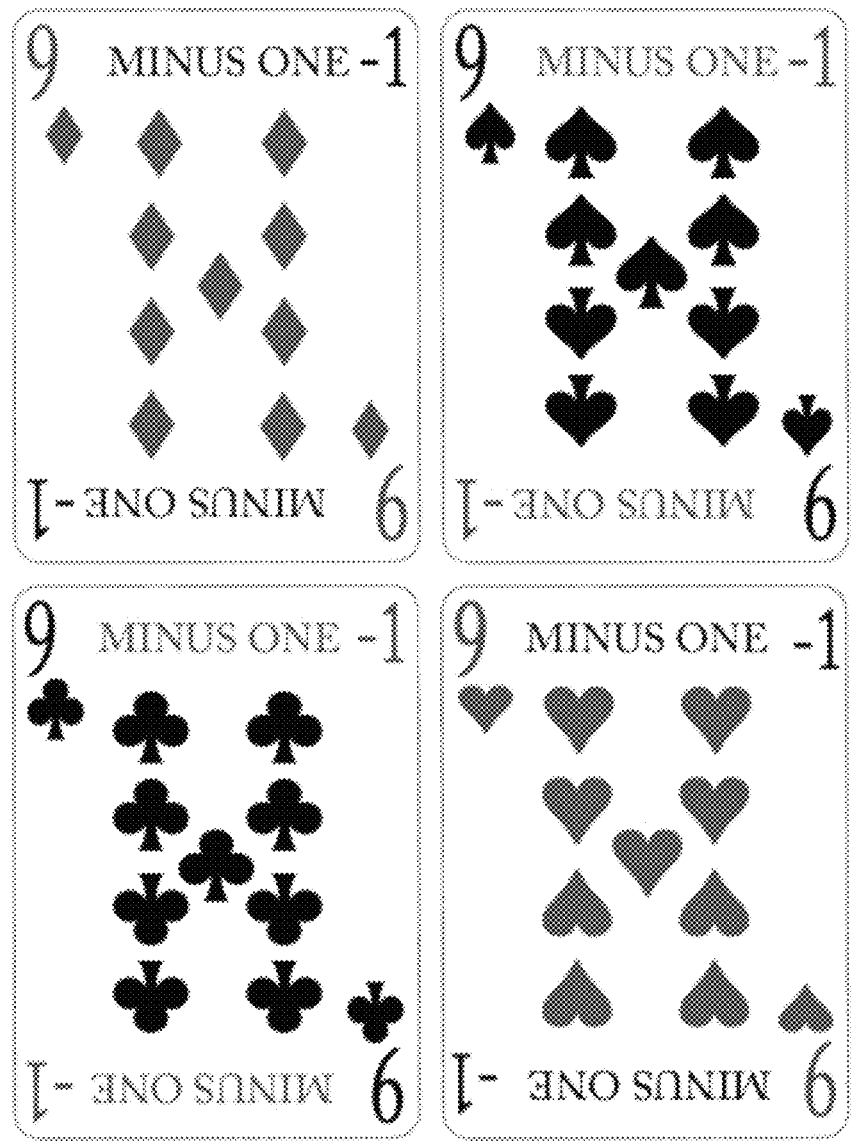
Figure 9C:
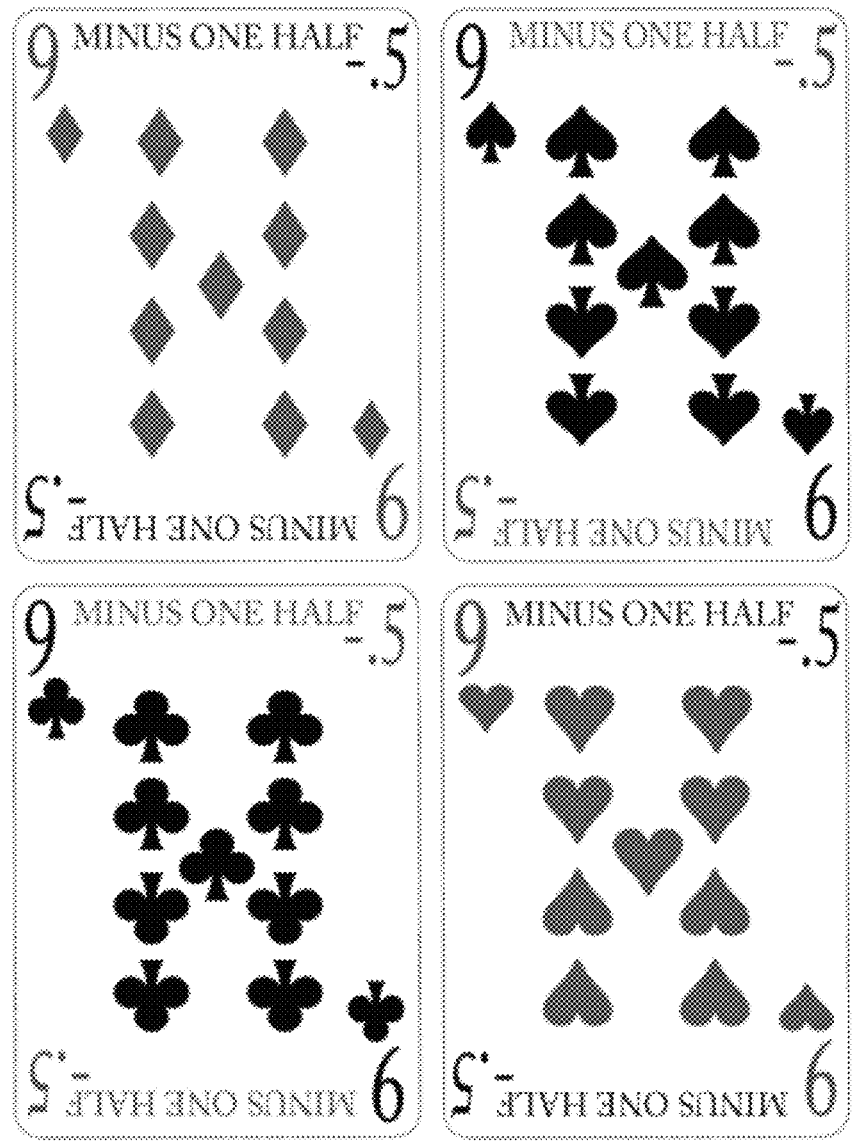
Figure 9D:
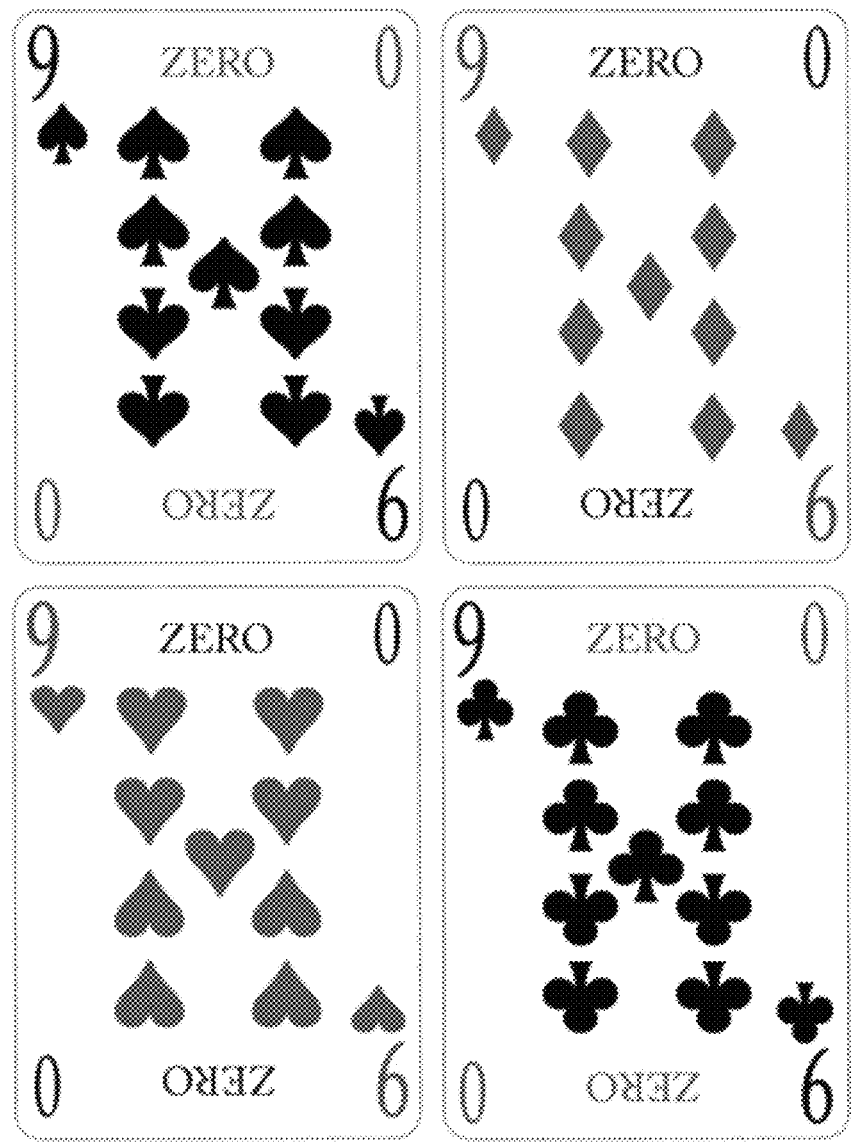

The Hi-Lo count is easy to learn. As Chart 1 shows there are separate groups of card values. The 20 small cards (2-6) (see FIGS. 2C, 3A, 4A, 5A and, 6A) are counted as plus 1 as they are played. The 12 middle cards (7-9) (see FIGS. 7A, 8B and 9D) are considered neutral cards and do not change the count as they are played. The 20 big cards (10-Ace) (see FIG. 1C) are counted as minus 1 as they are played. This system is considered to be a balanced system because if you counted down every single card in a 52 card deck, you would end up with a count of 0.

The Hi-Lo card counting system is analogous to a game of tug-of-war, where each different card is changing the count one way or the other. It is an ongoing battle between the high cards and the low cards to control the card count. The player is rooting for the underdog, because the more smaller cards that are played, the higher odds of winning are. When less smaller cards are in the deck, you have better chances of being dealt blackjack, the dealer busting, or just getting strong starting hands.

When a player first sits down at a blackjack table, that is using a new full shoe of cards, the count at the table starts at 0. From the initial 0 count, the player will be adding 1, subtracting 1, or adding 0, for every single card that is dealt. If the player accidentally misses cards that are dealt and your count gets off, the player can shift your odds of winning without your knowledge.

The Hi-Opt I Count

The Hi-Opt I is based on adding and subtracting the number 1, so only simple math is used. To use this card counting system the player needs to learn the respective value for each card in a deck as shown in Chart 1.

According to the above-referenced chart, there are separate groups of card values. All 2's in the deck carry a value of 0 in this system and don't change the count when they are played. The 16 other small cards (3-6) (see FIGS. 3A, 4A, 5A and 6A) are counted as plus 1 as they are played. The 12 middle cards (7-9) (see FIGS. 7A, 8A and 9D) are considered neutral cards and do not change the count as they are played. The 16 big cards (10-King), excluding Aces, are counted as minus 1 as they are played (see FIGS. 10C, 11C, 12C and 13C).

There are separate rule variations for tracking Aces in the Hi-Opt I counting system. This system doesn't keep track of Aces in the card count but there are still changes to basic strategy that need to be made depending on how many aces have been played. Many players use external things such as chips, fingers, or feet, to keep track of how many aces have been played.

The Hi-Opt II Count

The Hi-Opt II count is based on counting, but incorporates more than just the values of 0 or 1. With Hi-Opt II, certain cards have a value of 2.

The most complicated element of the Hi-Opt II system is that the cards have a larger range of values which make it harder to keep track of each card value and harder to keep an accurate count during an actual blackjack game.

Figure 4A:
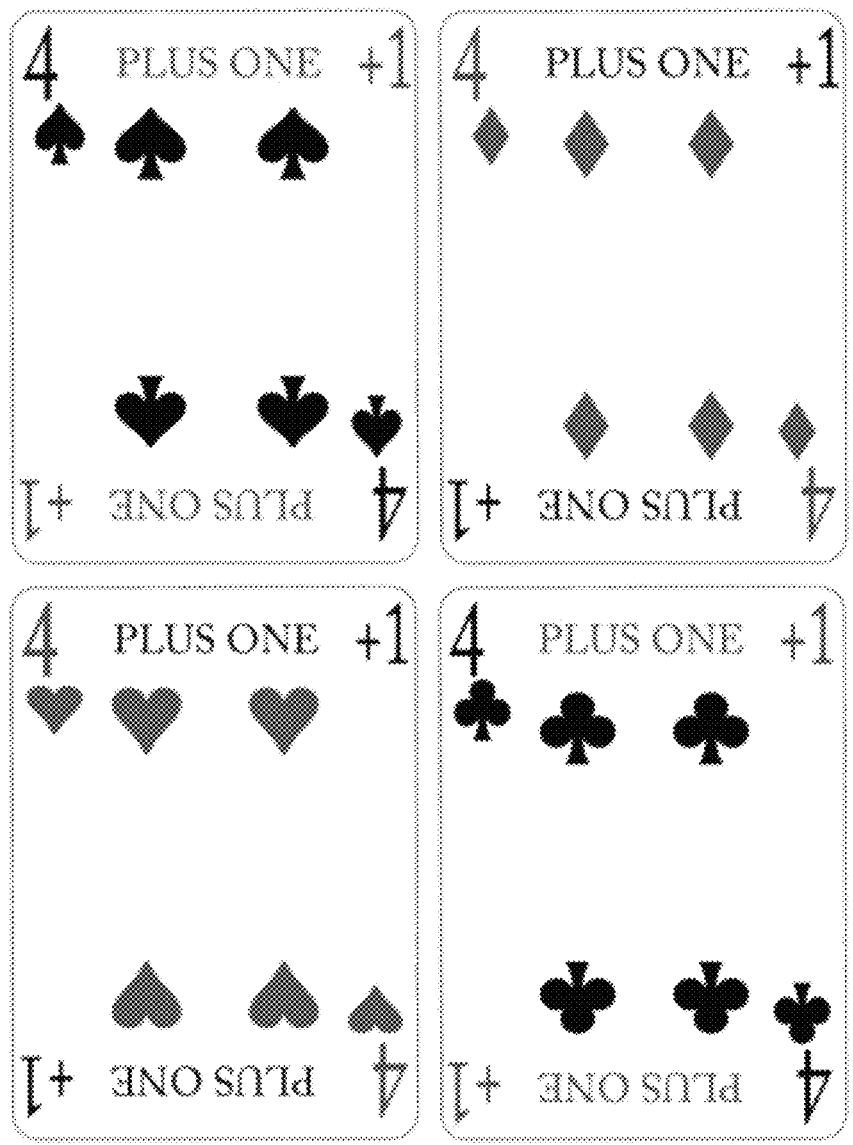
FIGS. 4A-4 C shows the 4 cards with varying values according to one embodiment of the present invention.
Figure 4B:
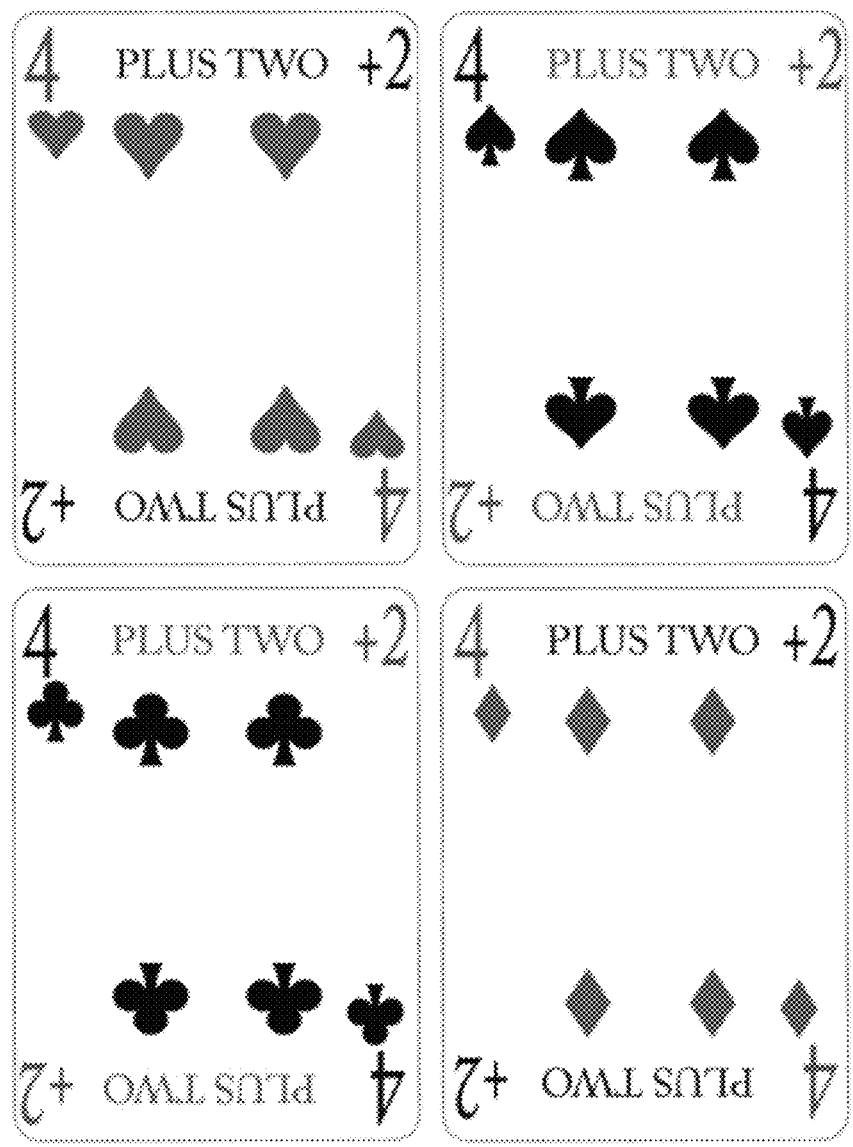
Figure 4C:
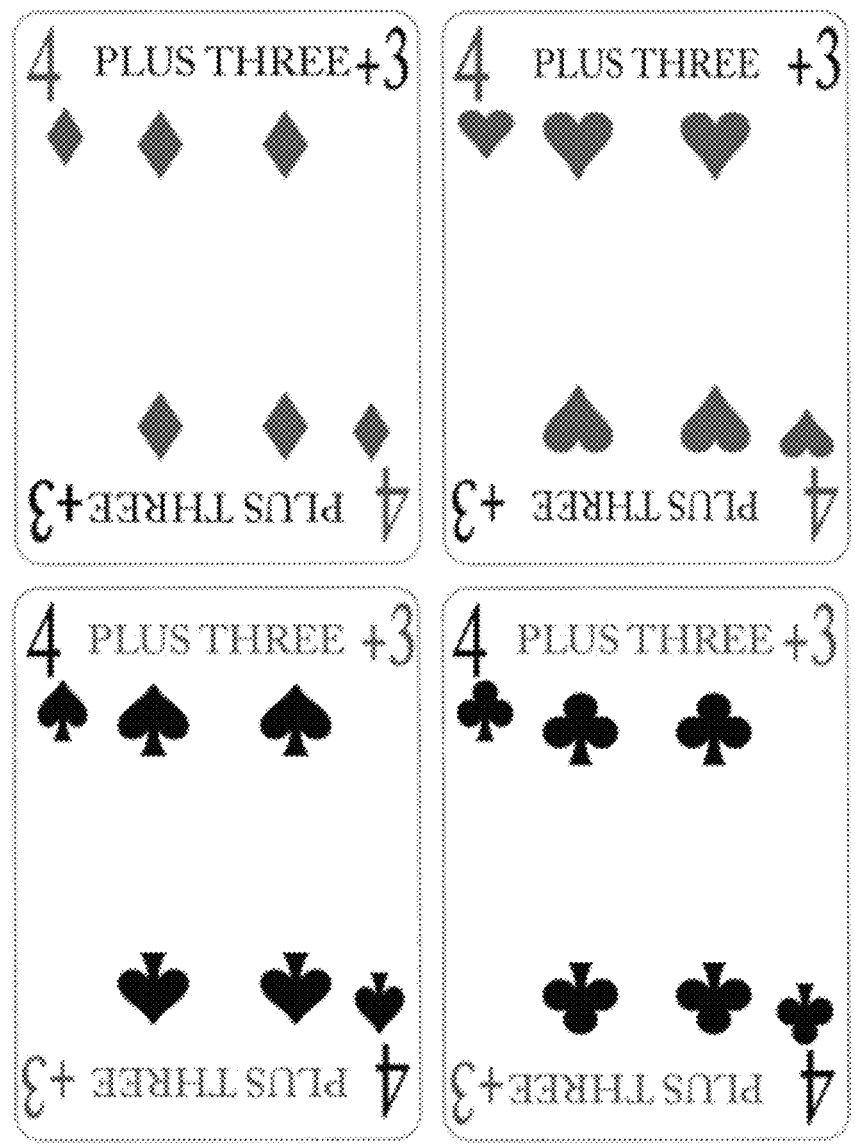
Figure 5A:
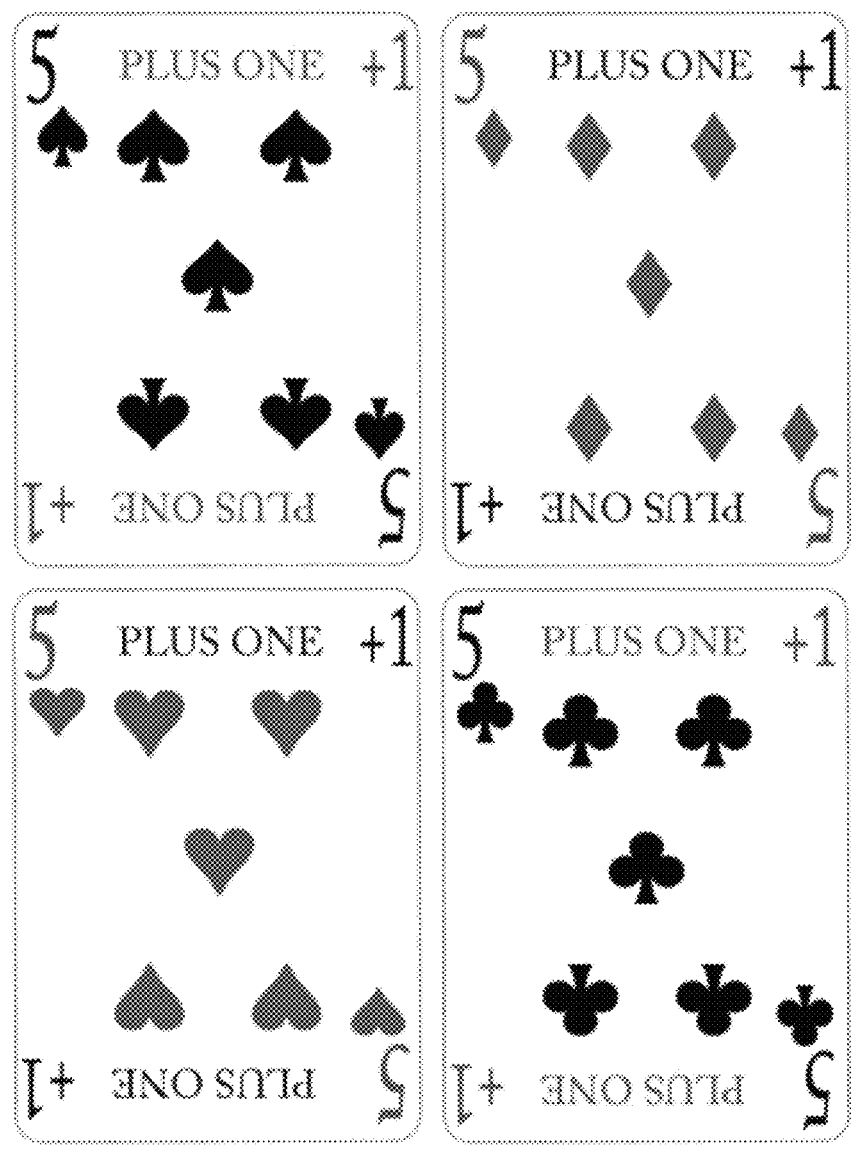
FIGS. 5A-5E shows the 5 cards with varying values according to one embodiment of the present invention.
Figure 5B:
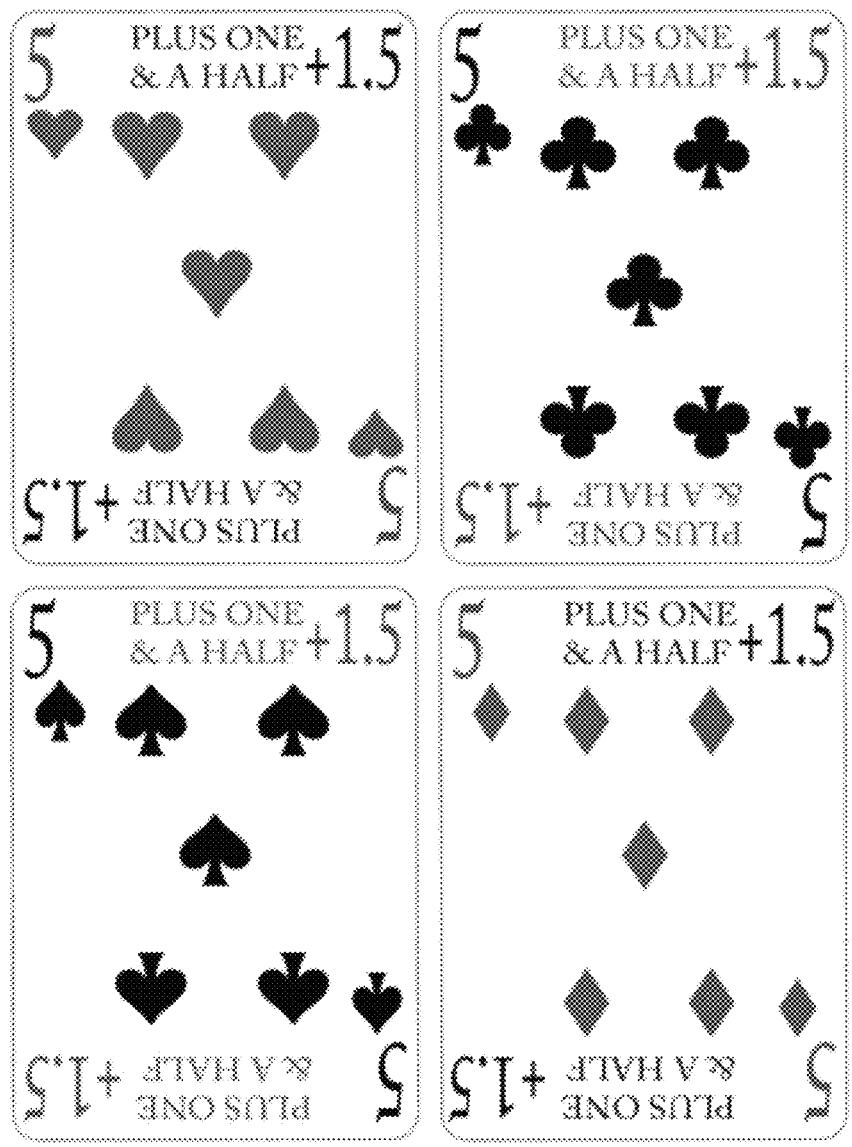
Figure 5C:
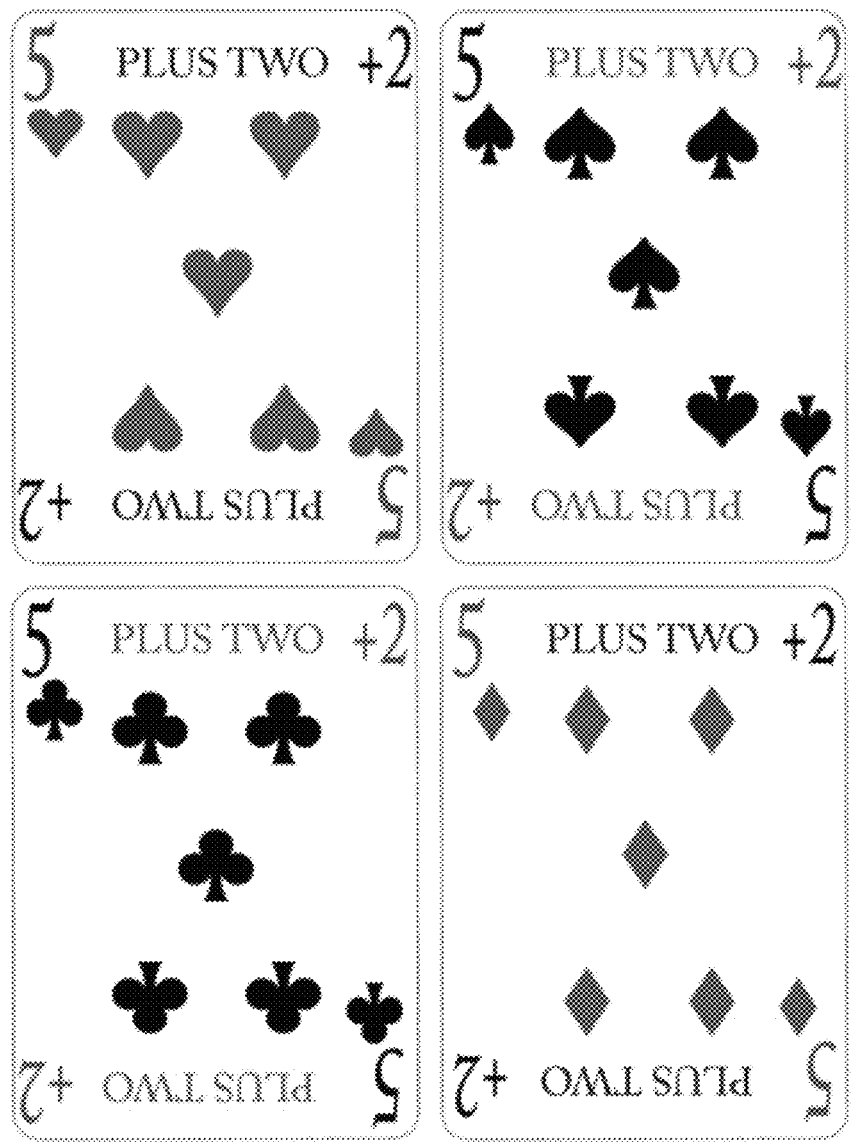
Figure 5D:
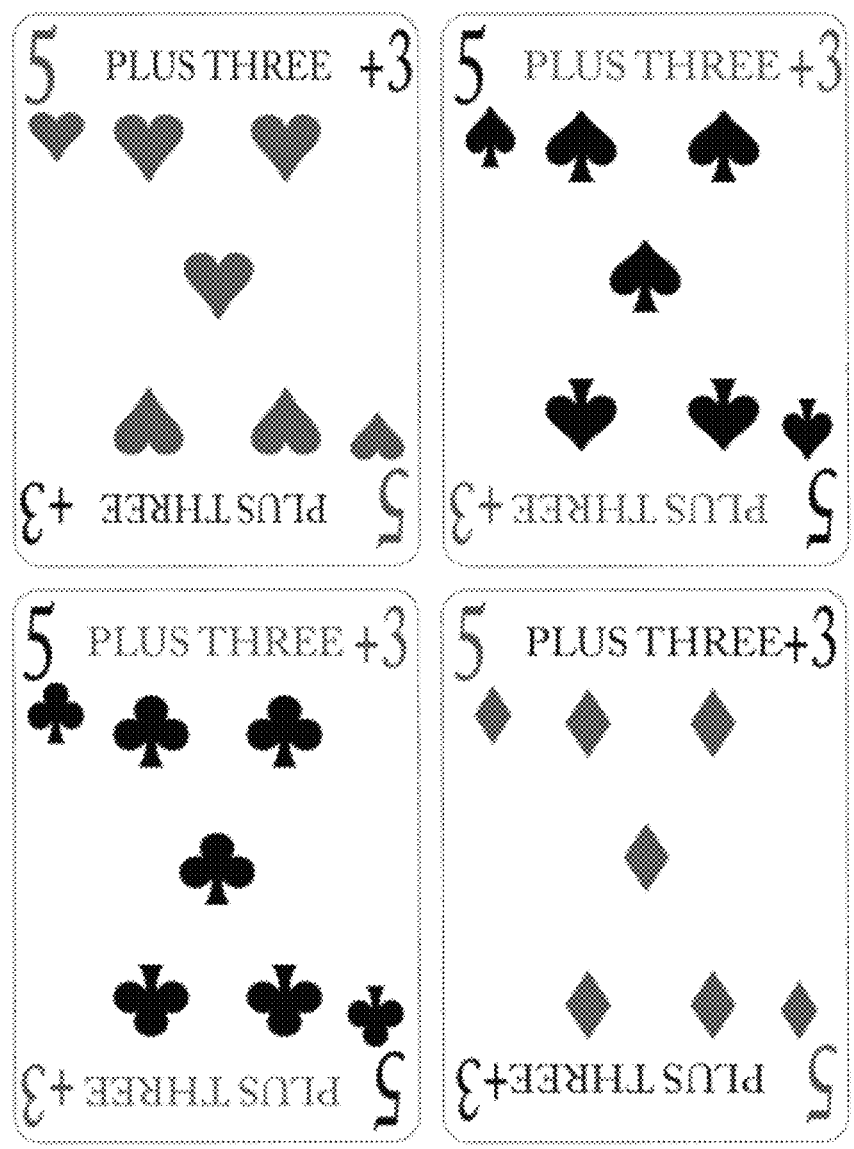
Figure 5E:
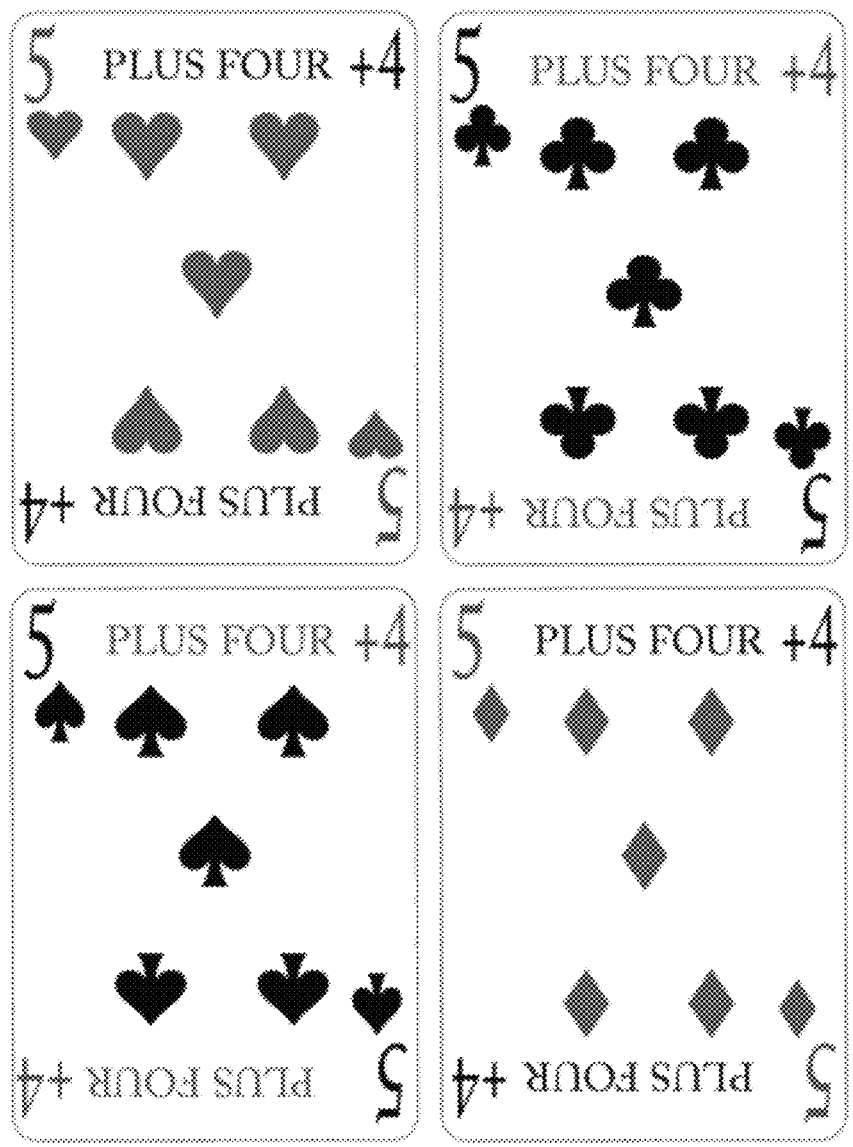
Figure 6A:
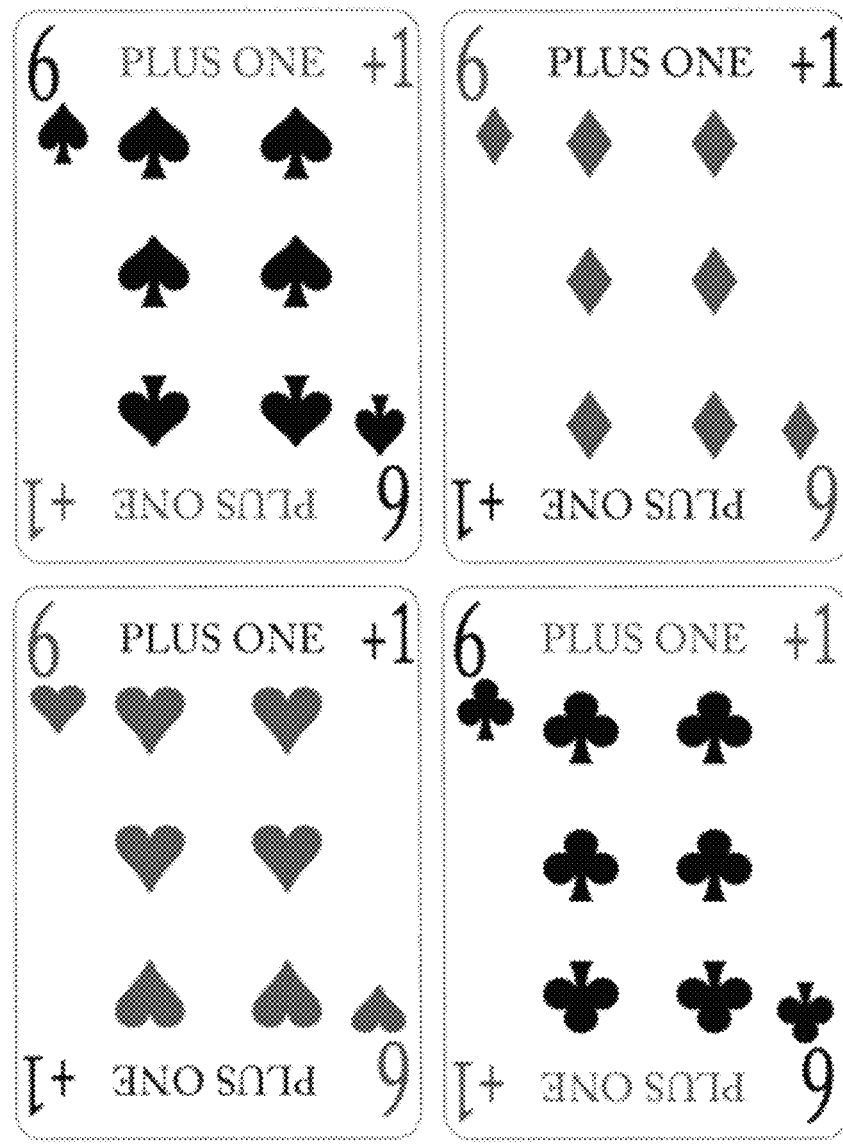
FIGS. 6A-6C shows the 6 cards with varying values according to one embodiment of the present invention.
Figure 6B:
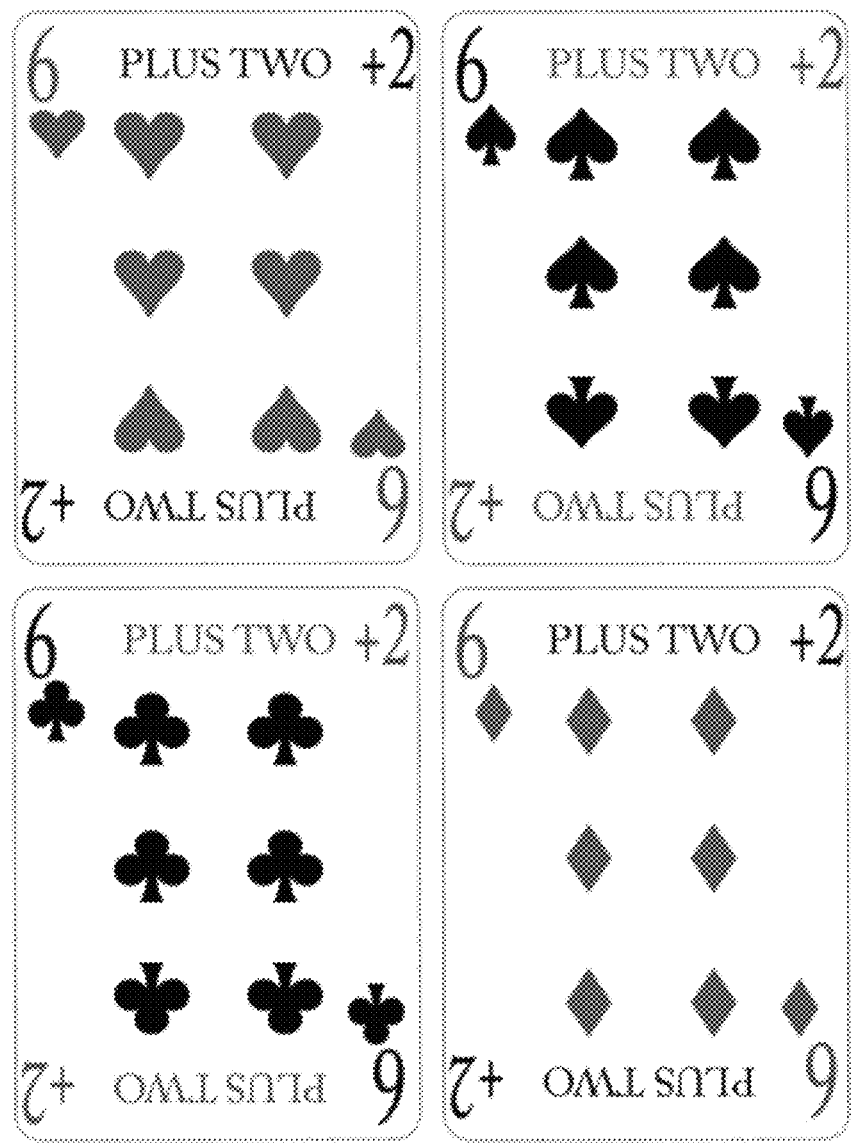
Figure 6C:
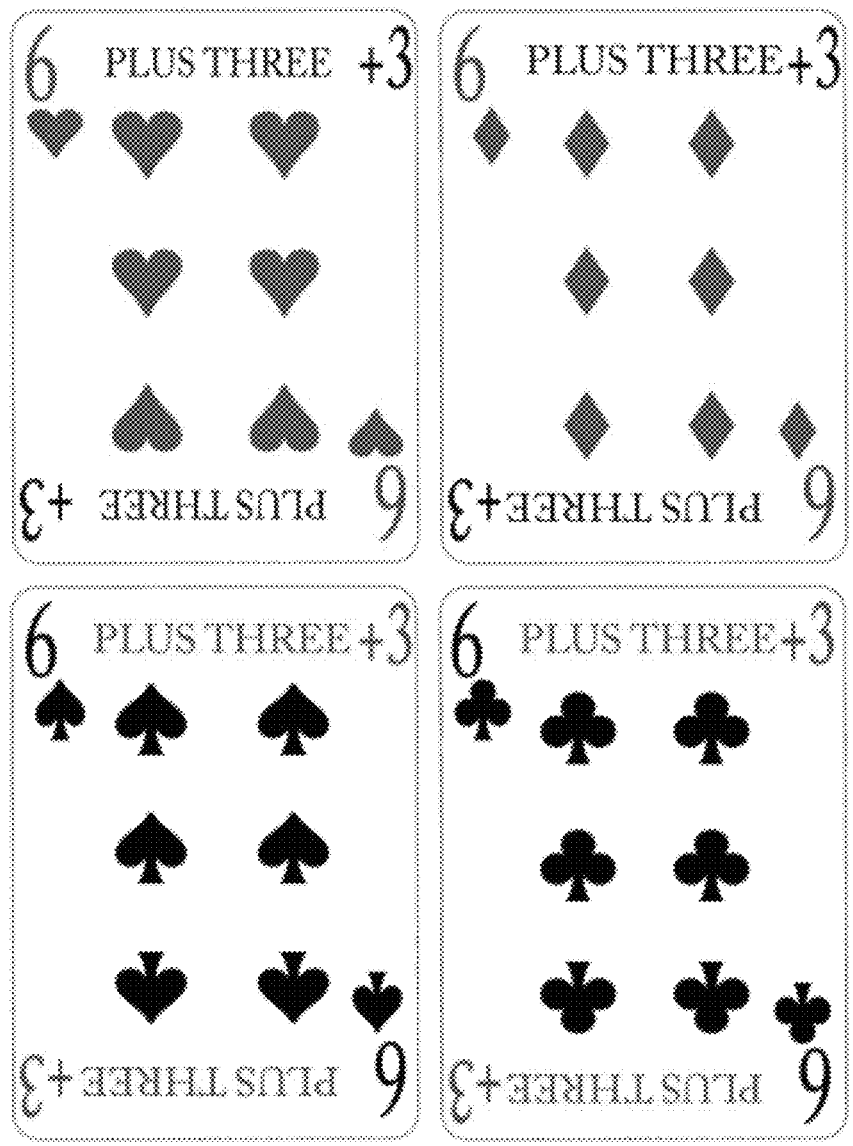
Figure 10A:
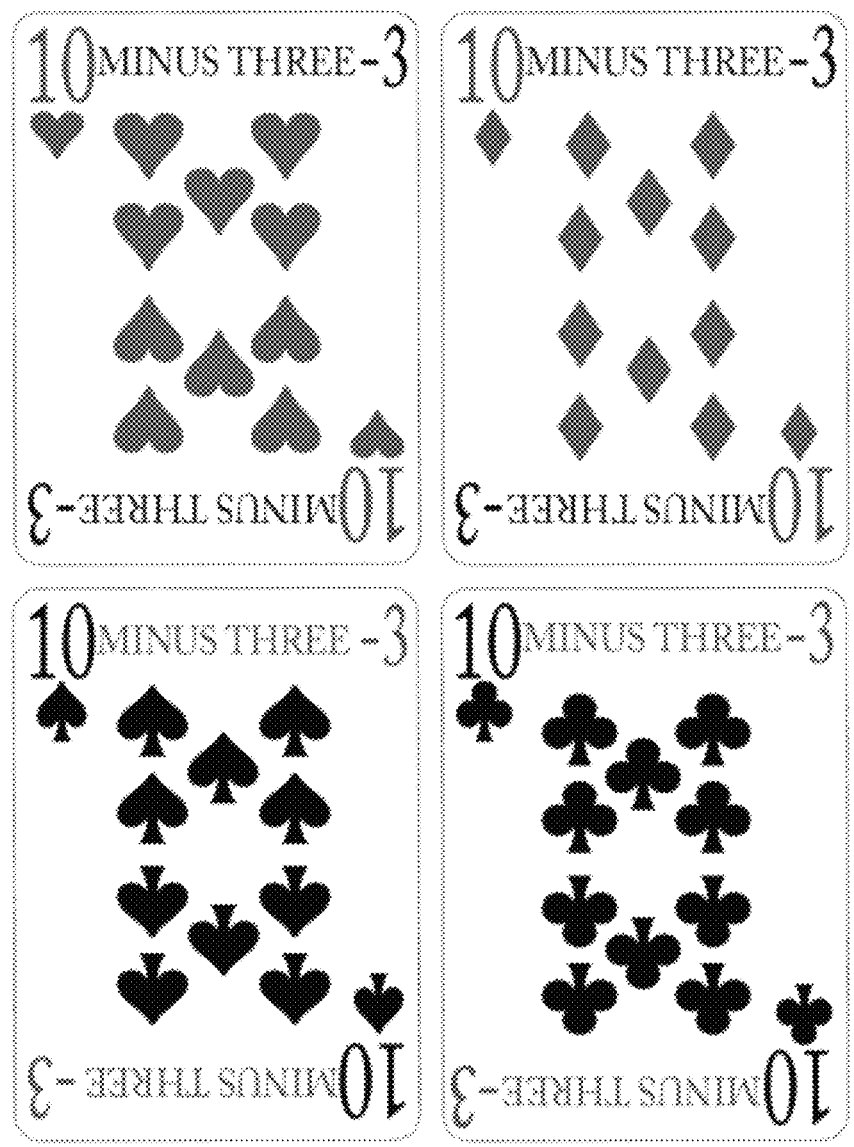
FIGS. 10A-10C shows the 10 cards with varying values according to one embodiment of the present invention.
Figure 10B:
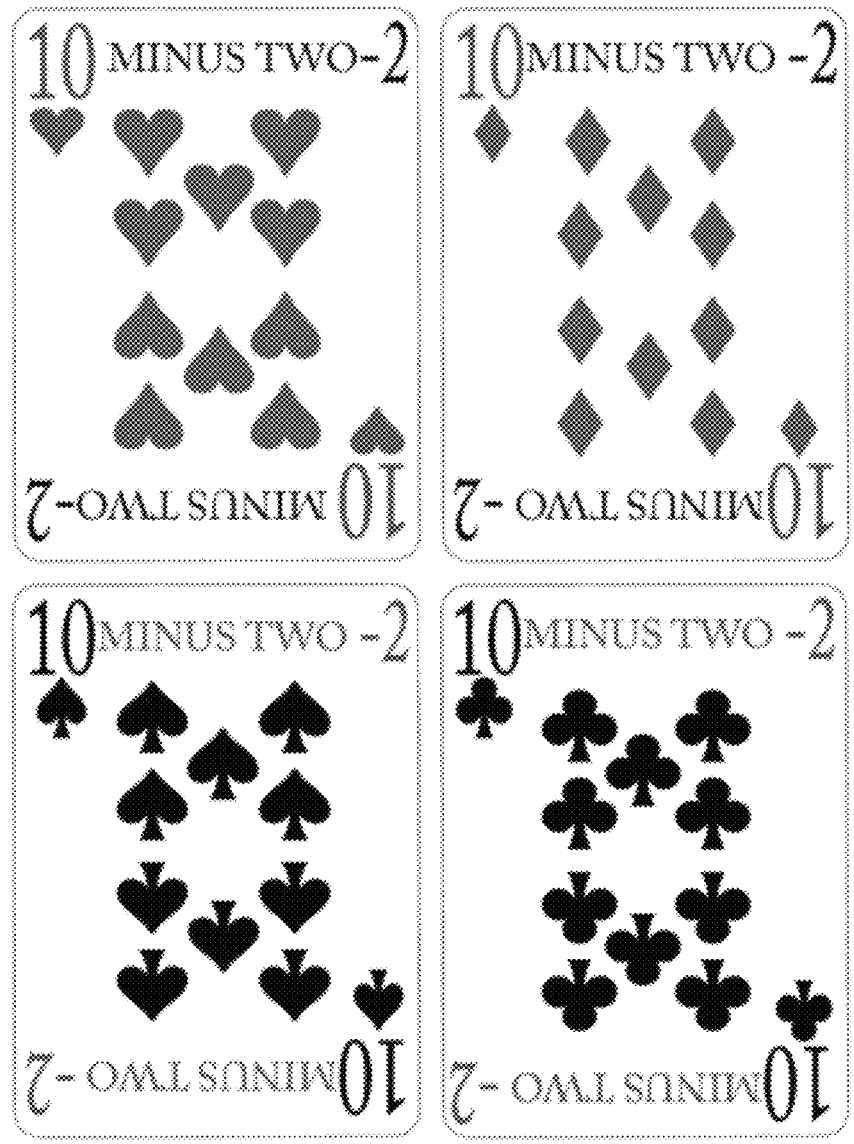
Figure 10C:
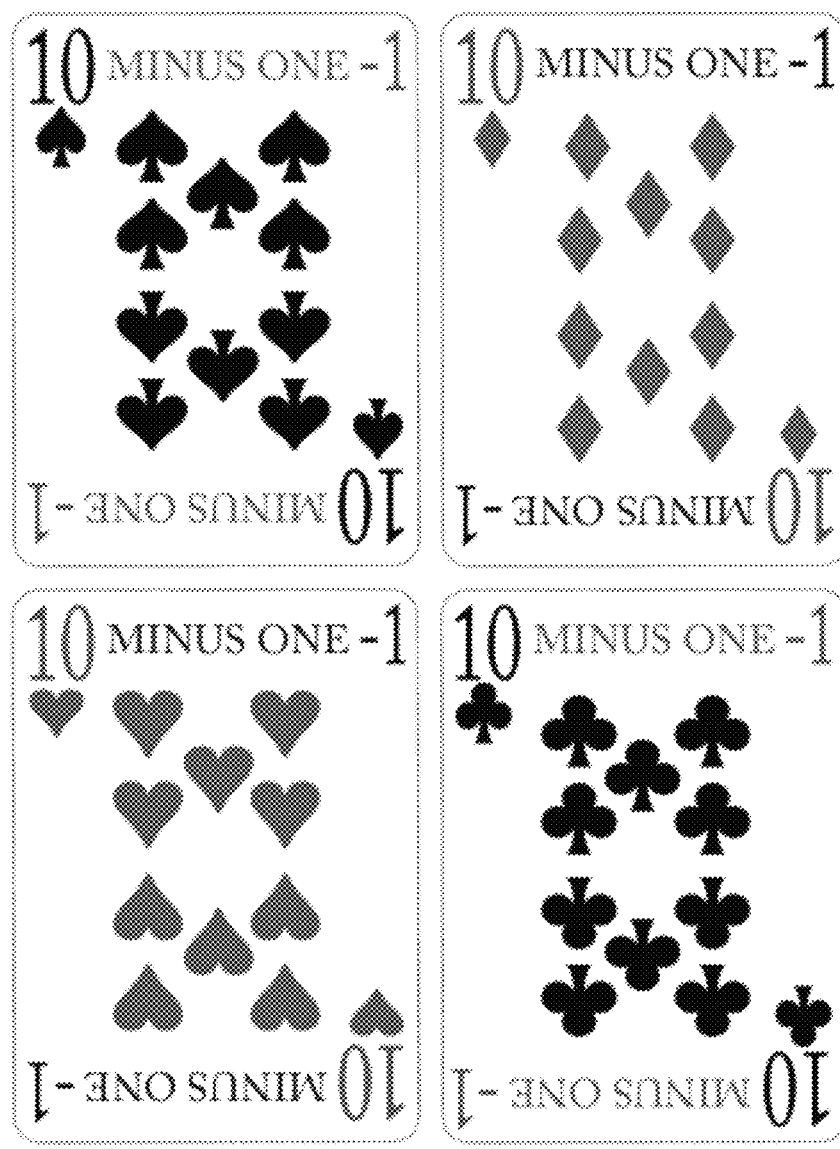
Figure 11A:
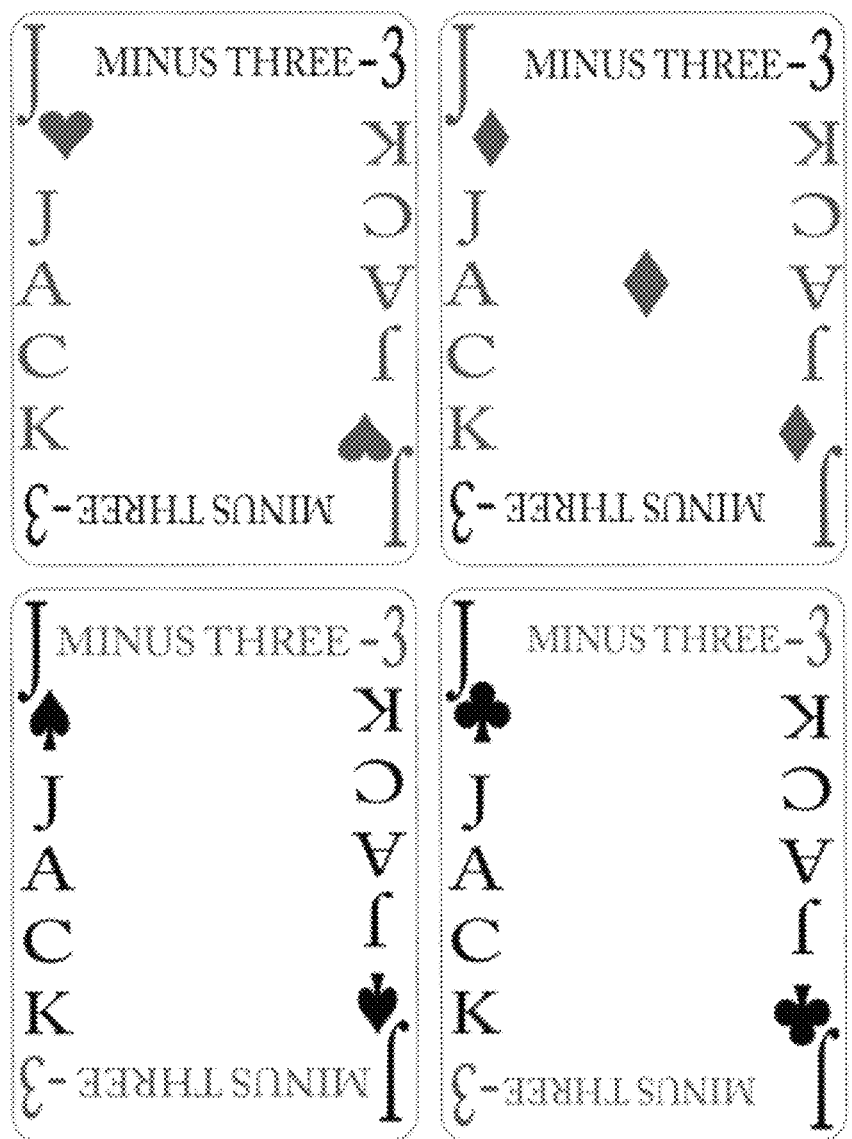
FIGS. 11A-11C shows the Jack cards with varying values according to one embodiment of the present invention.
Figure 11B:
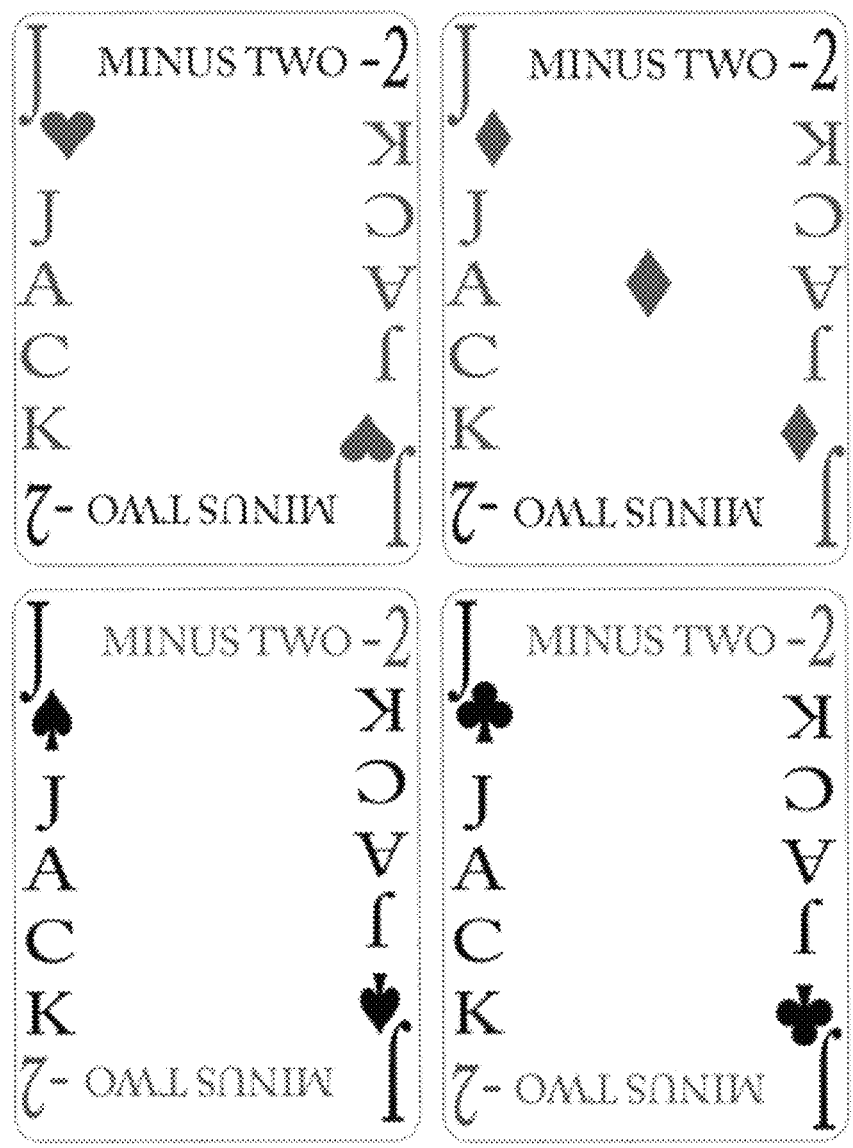
Figure 11C:
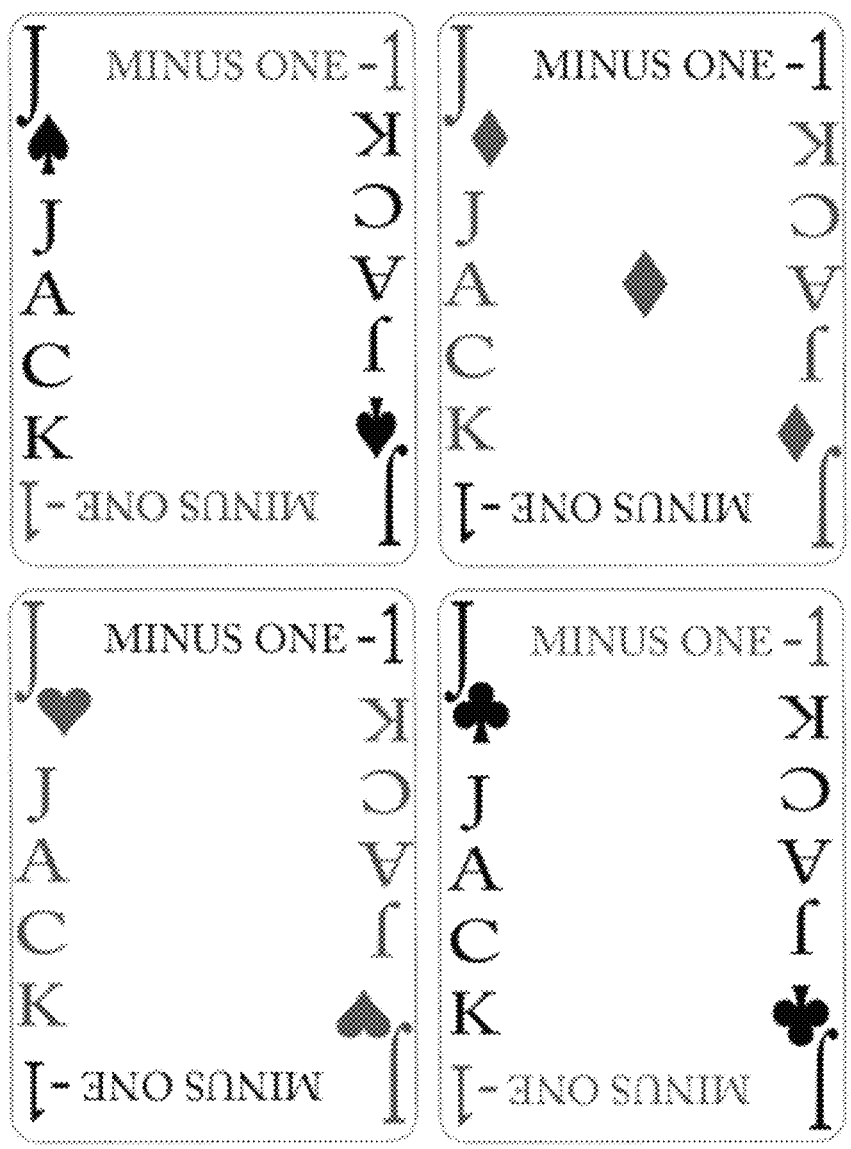
Figure 12A:
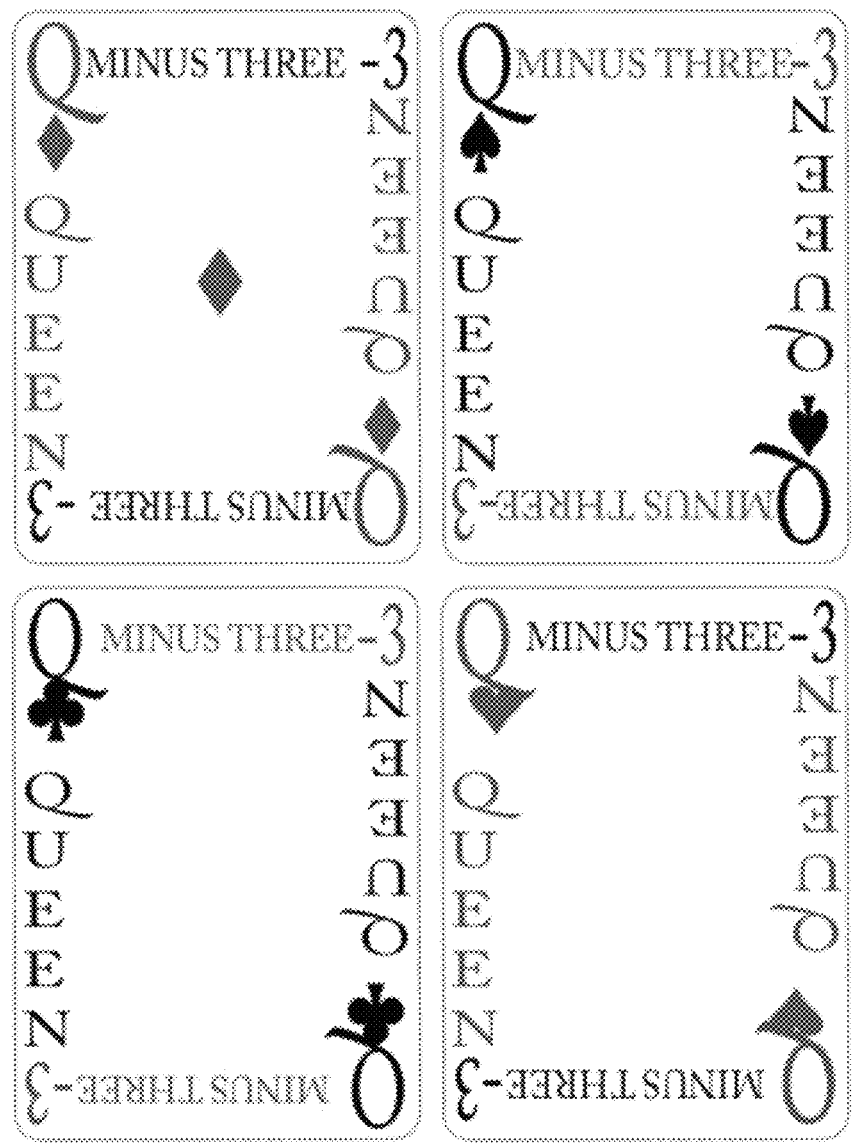
FIGS. 12A-12C shows the Queen cards with varying values according to one embodiment of the present invention.
Figure 12B:
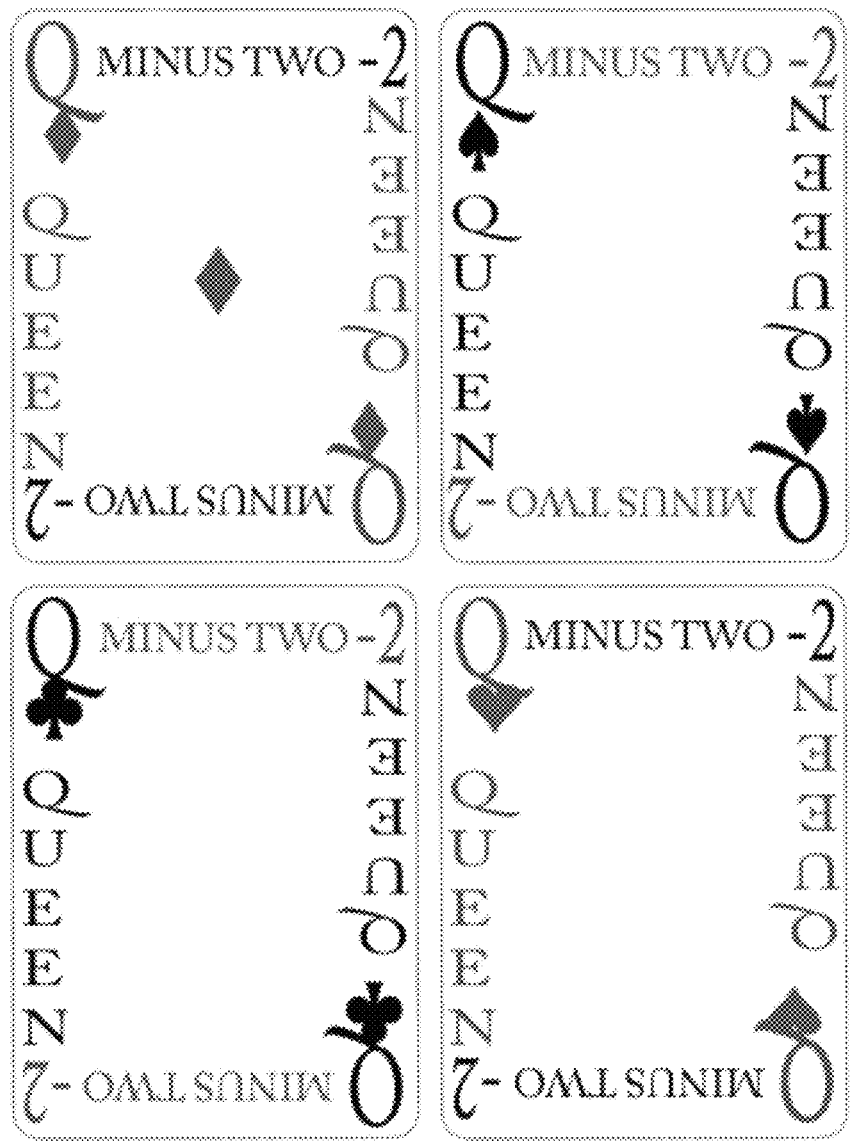
Figure 12C:
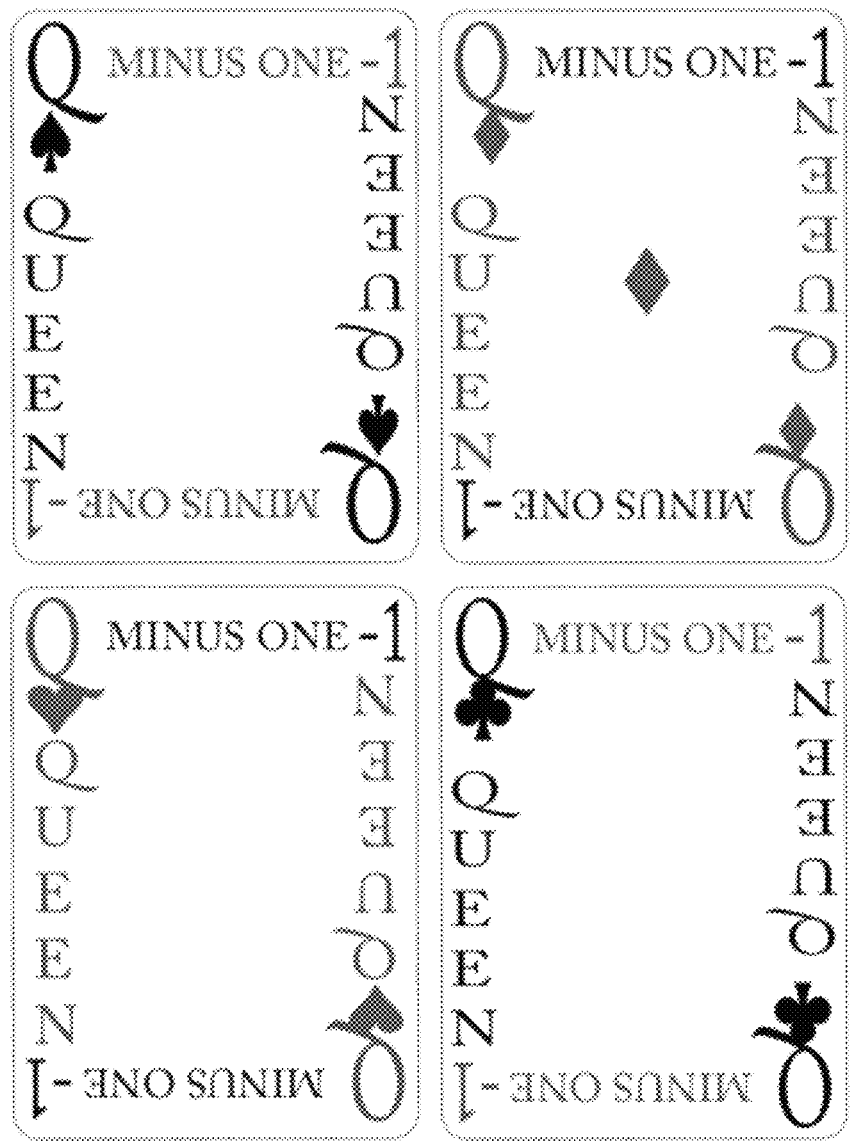
Figure 13A:
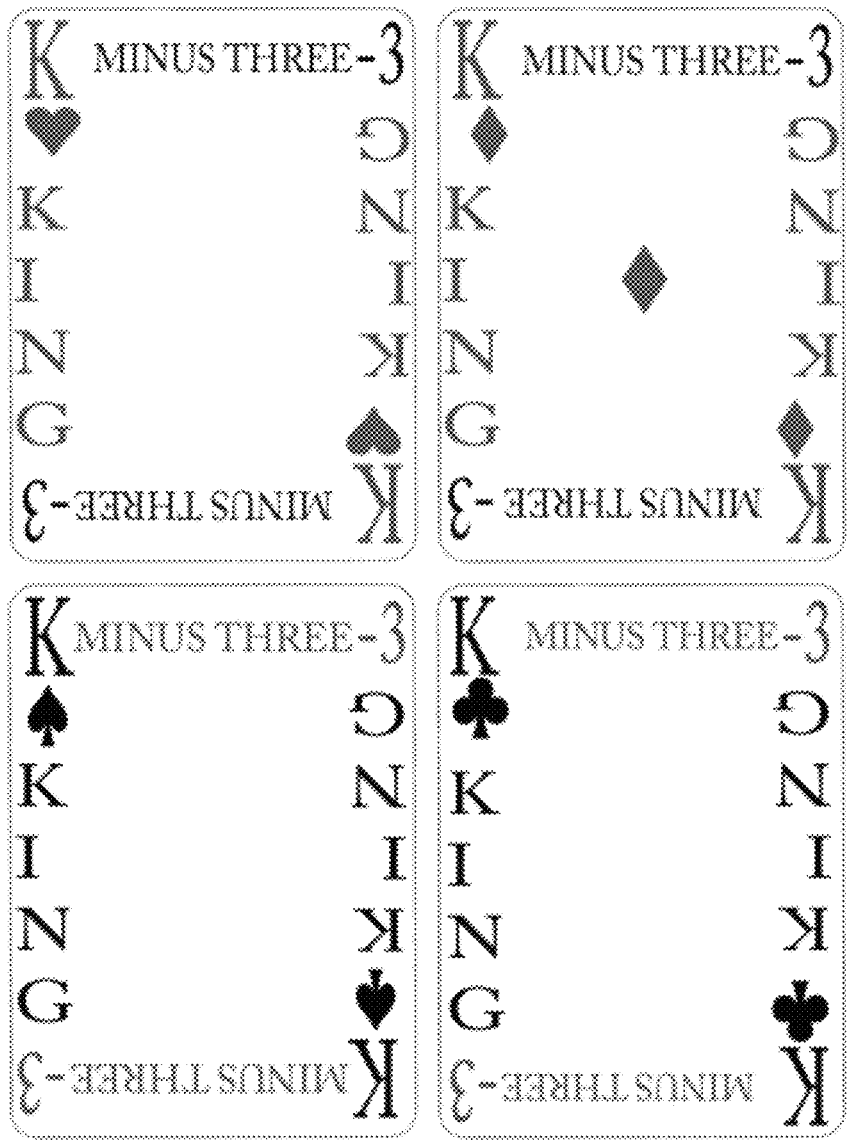
FIGS. 13A-13C shows the King cards with varying values according to one embodiment of the present invention.
Figure 13B:
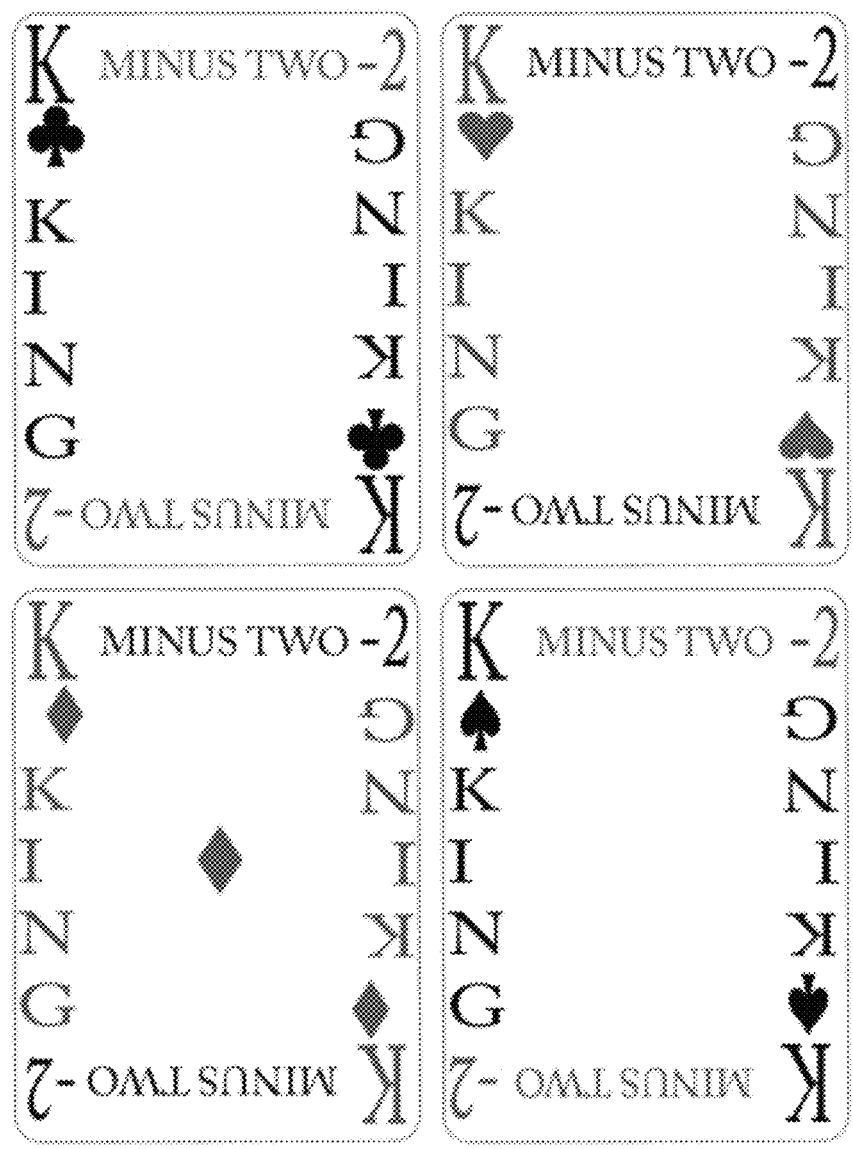
Figure 13C:
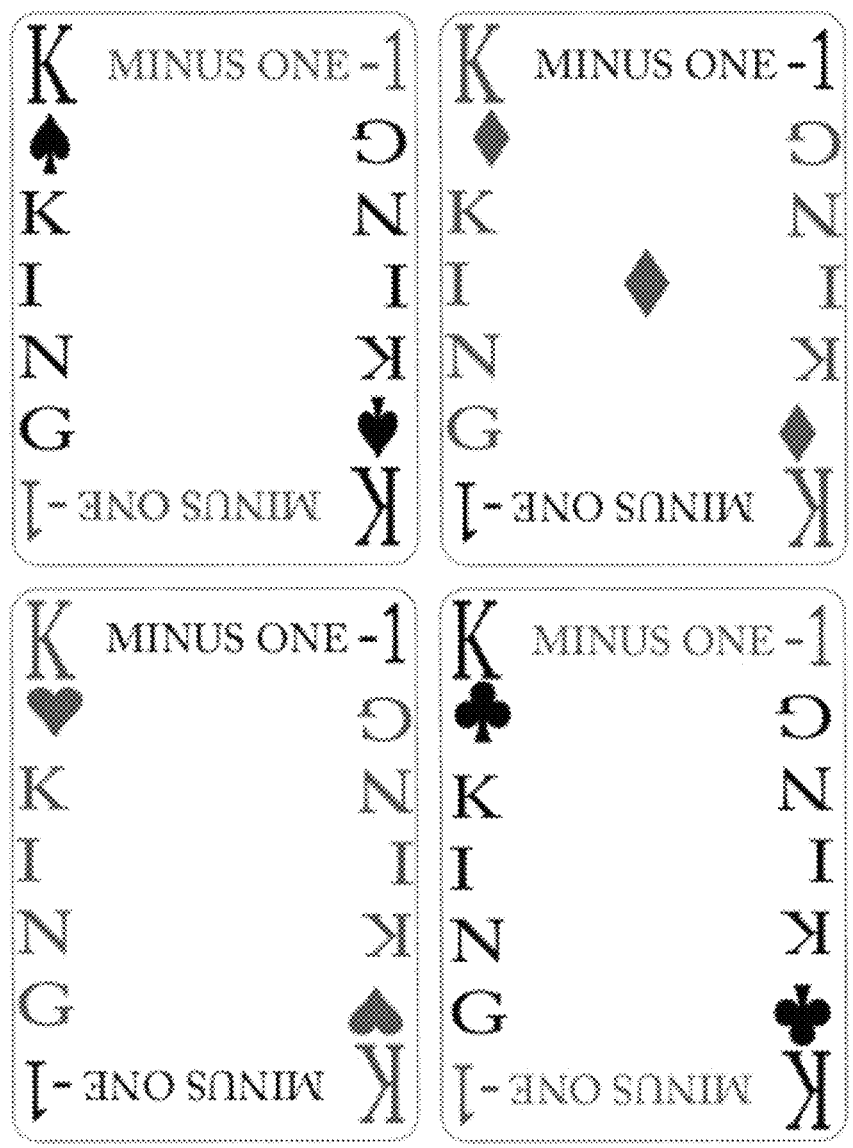

There are separate groups of card values. All 2's, 3's, 6's, and 7's in the deck carry a value of +1 when they are played. (see FIGS. 2C, 3A, 6A and 7C). All 4's and 5's in the deck carry a value of +2 when they are played (see FIGS. 4B and 5C) and all 8's and 9's carry a neutral value of 0 (see FIGS. 8A and 9D). All of the 16 higher cards, with the exception of the Aces, carry a value of −2 (see FIGS. 1B, 10B, 11Bm 12B and 13B).

The Hi-Opt II system shows that Aces have a neutral 0 count, but this isn't entirely true. Aces aren't actually counted in your count but there are several variations and changes to your basic strategy you'll need to make, depending on how many aces have been played instead of keeping track of aces in the card count, people often use external things such as chips, fingers, or feet, to track aces. We will not be covering the different ace variations in this section.

The Hi-Opt II card counting method is considered to be a balanced card counting system because if the player can count through an entire deck of 52 playing cards, he/she should end up with a count of 0.

KISS 1

The KISS strategies are designed to start simple and add complexity. KISS 1 is used for beginners that wish to play rarely. These are suit-aware counts, namely the 2 is counted differently depending on the color of the suit.

The KO Count

The KO card counting system, also known as the Knock-Out card count, is a system where if you counted down an entire deck of cards, you will NOT end up with a count of 0. The KO strategy adds one extra small card to the Hi-Lo count, the 7, as a +1 value (see FIG. 7C). So by using this system you will end up with a count of positive 4 if you counted down a deck of cards, because there are 4 sevens in every deck. The imbalance of this counting system is created to deliberately avoid the need to make true count conversions.

In Knock-Out Blackjack, the authors claim that it is too mentally taxing for the majority of blackjack players to constantly be converting back and forth between the true count and the running count, which makes sense. It can often be difficult to keep converting back and forth if one is playing in a crowded casino that is generally full of distractions. The KO card counting system was designed to make card counting slightly easier on the player.

Mentor

Mentor is a Level II balanced strategy suitable for shoes or pitch games and is similar to the Zen Count. These are compromise counts designed to strike a balance between shoe games and hand-held games. Mentor is slanted slightly more towards shoe games. True-counting in Mentor is somewhat unusual as you essentially divide by remaining double decks.

Omega II

Omega II is an advanced, Level 2, balanced strategy with a large number of indexes similar to Canfield Master. An Ace side count improves betting efficiency when used. Many indexes are risk-averse and this count was popular with many pros in the 90s. However, less complex strategies are now in vogue.

Red Seven

Figure 7B:
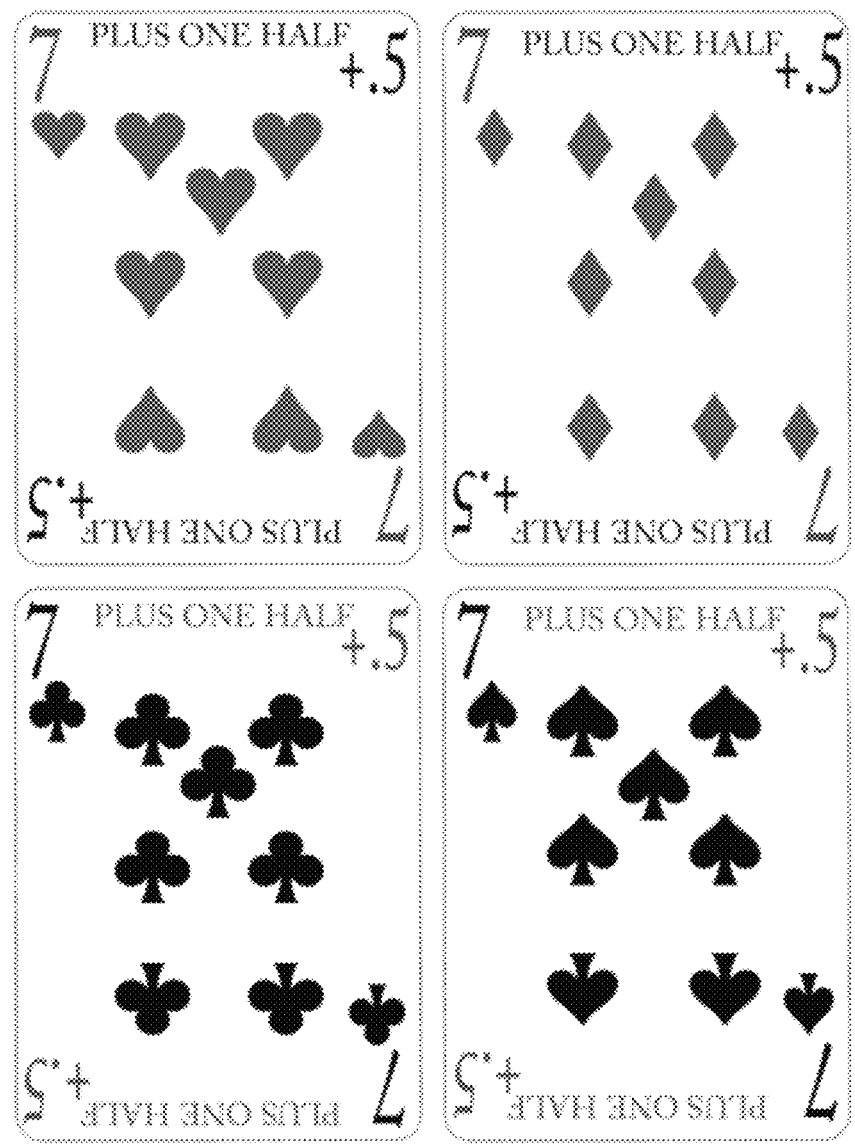
Figure 7C:
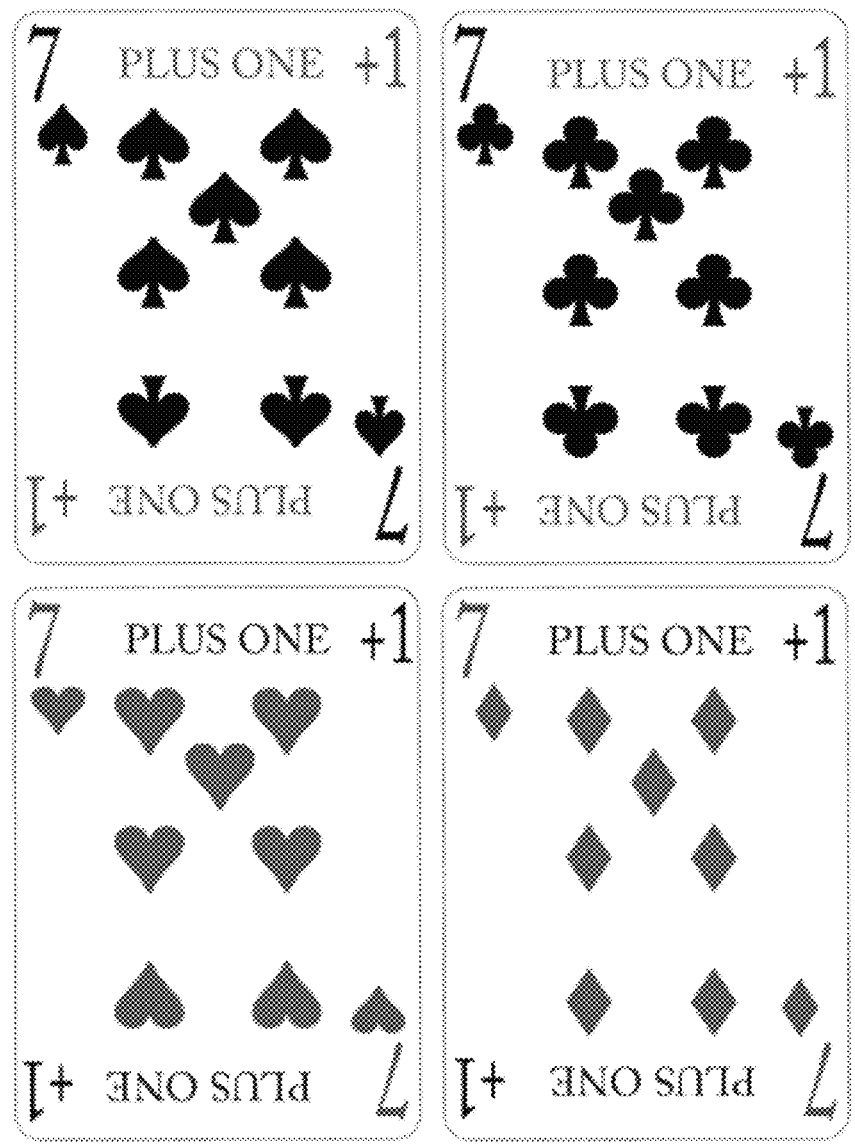
Figure 7D:
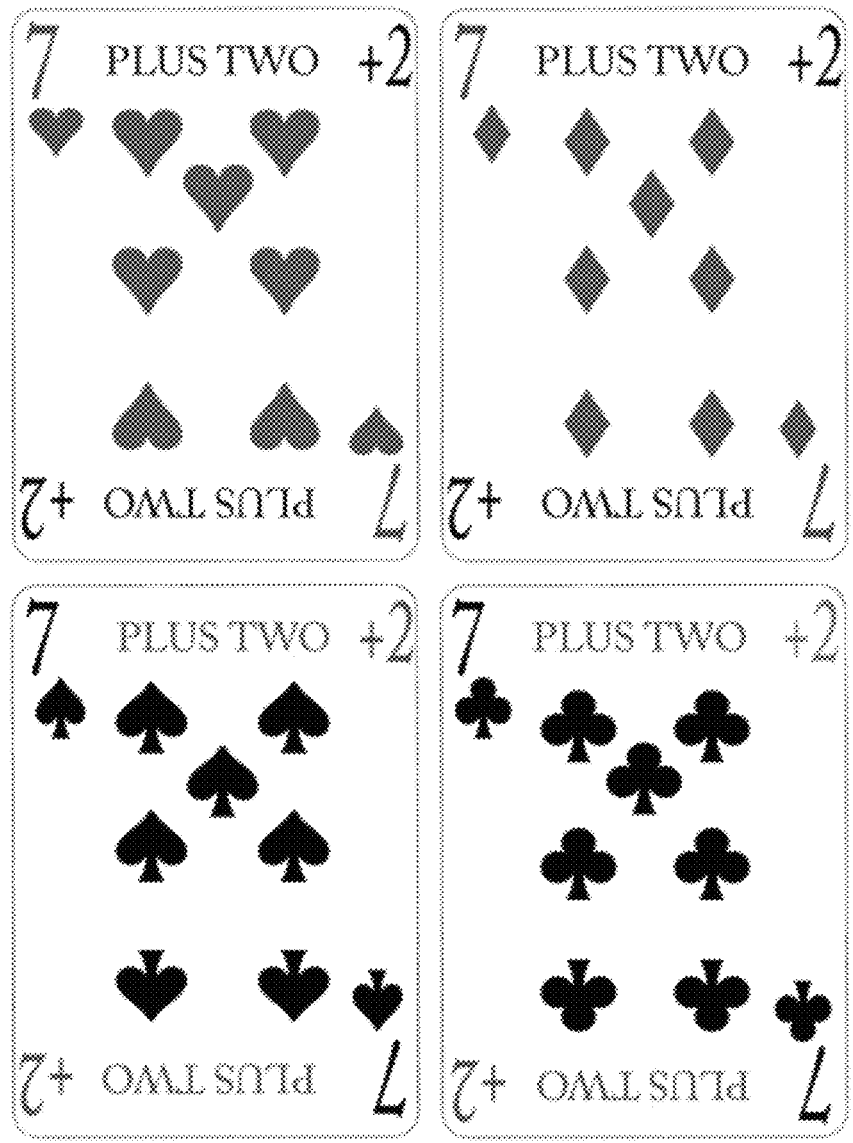
Figure 7E:
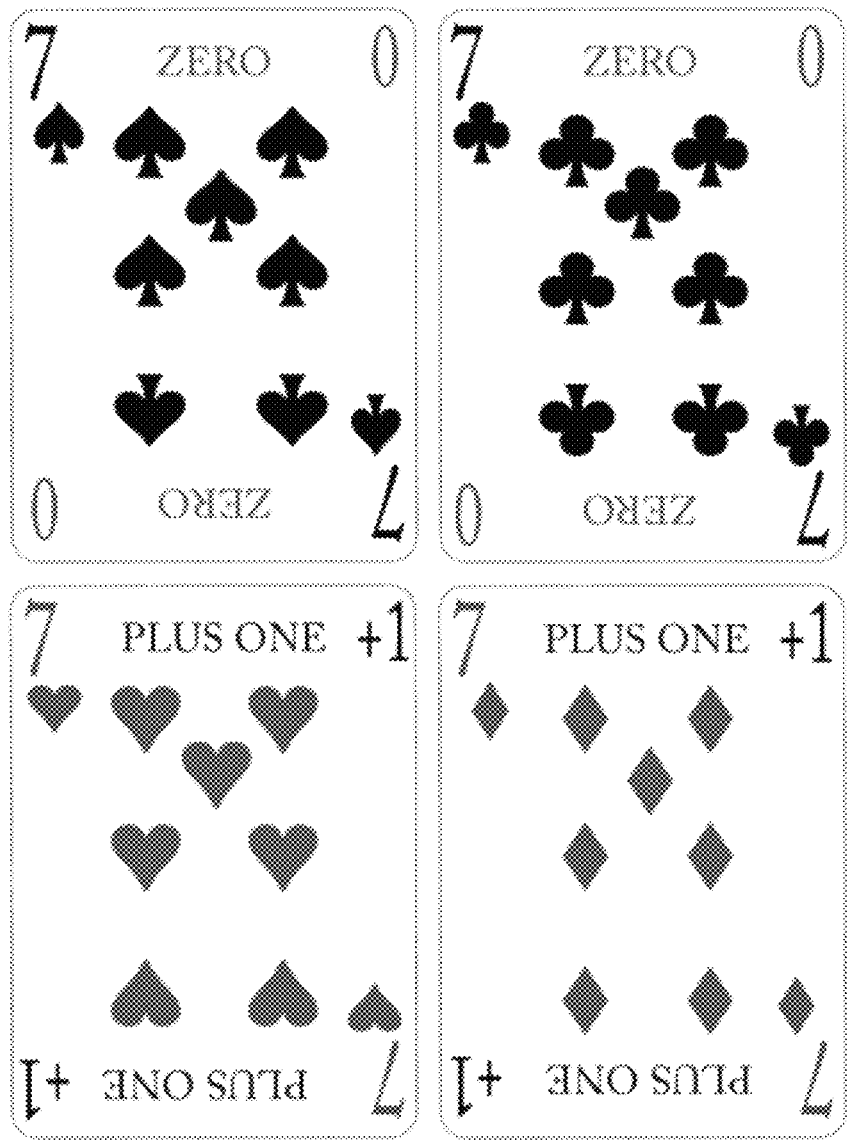

Red Seven is a Level 1, unbalanced card counting technique optimized for betting. This is a suit-aware count, specifically, the 7 is counted differently depending on the color of the suit. In some systems the seven is counted as 0.5, which may increase results somewhat, however the system is more difficult (see FIG. 7B).

REKO

REKO is a simplified version of K-O which is a very easy, yet powerful, level 1, unbalanced strategy optimized for betting. Unlike K-O, REKO only has one index value, +2, for all indexes and all numbers of decks and yet it has the same power as K-O Preferred.

Revere Advanced Plus-Minus

Revere Advanced Plus-Minus is a Level 1, balanced strategy and is the simplest of many strategies aimed at single deck games.

Revere Point Count

Revere Point Count is an advanced, Level 2, balanced strategy optimized for betting for shoes given the 99% betting correlation. A few players use an Ace side-count when playing single-deck games with RPC, however this is very difficult and unneeded. Many long time players still use this strategy. However, new players rarely use it with the availability of easier counts.

Revere RAPC and 14 Count

Revere RAPC and 14 Count are proprietary strategies that are very complex and little used these days. These high level counts were used to pros in the early days of counting and some of them continue to use these counts. However, current research indicates that substantially simpler system may give about the same results.

Silver Fox

Silver Fox is a Level 1, balanced strategy optimized for betting. This is an inexpensive, proprietary system similar to the Green Fountain Count.

Unbalanced Zen

Unbalanced Zen is a simple, Level 2, unbalanced card counting system optimized primarily for betting. This is an inexpensive, proprietary strategy that is a cross between RPC and Zen, but is not balanced. It is designed for switching between hand-held and shoe games. Some K-O players graduate to UBZ2 for extra power.

Uston Advanced Plus-Minus

Uston Advanced Plus-Minus is a Level 1, balanced strategy optimized for betting similar to Hi-Lo, but biased a bit more toward hand-held games.

Uston APC—Uston Advanced Point Count

Uston Advanced Point Count is an advanced, Level 3, balanced strategy with a large number of indexes optimized for Playing Efficiency. This is one of the more complex card counting strategies.

Uston SS

Uston SS is an advanced, Level 3, unbalanced strategy optimized for betting. This system is an oddity and includes an advanced, unbalanced strategy. It was designed as the "Strongest and Simplest" (hence SS) strategy. There are very few indexes used in shoe games as the strategy relies on its 99+% Betting Correlation.

Wong Halves

Wong Halves is an advanced, Level 3, balanced strategy, using fractions and optimized for betting. Even though this system is one of the strongest systems, it is quite difficult. Most players double the tag values to remove the fractions. Although still in use, most people opt for much simpler strategies as current research does not show that much of a difference. Originally, some people side-counted aces when playing single deck with Wong Halves.

Zen Count

Zen Count is an advanced, Level 2, balanced Blackjack strategy optimized for betting. This system is the strongest level 2 strategy barely beating RAPC and was designed as a compromise between single-deck and multi-deck strategies. It is played in two versions. In the first version, you divided by remaining decks to calculate the true count. In the latest version, you divide by remaining quarter-decks.

Some of the steps included in one method according to the present invention include selecting a strategy to be learned, selecting a deck of cards according to the strategy to be learned an additional step includes counting the playing cards and determining that a complete deck is assembled made up from 4 (One Spade, One Diamond, One Heart and One Club) cards (One Club, One Diamond, One Heart, One Spade) of each denomination per deck (A, K, Q, J, 10, 9, 8, 7, 6, 5, 4, 3, 2). An additional step includes shuffling the cards and determining the number of people playing the card game, and assigning the dealer position. Additional optional steps include providing chips to each player where each player places a bet. An optional step includes the dealer burning a card at the beginning of the game and determining whether the dealer will show a card and if so, the player noting the value of the card. Starting with the person to the left of the dealer, dealing each person two cards face up with exception to the dealer whose last card will remain face down and unseen by everyone playing. While the dealer is dealing the cards to each player, the player should determining the value of each card dealt or pulled from the shuffled pile for any reason and continue adding and/or subtracting the values written across the tops and bottoms of the cards. This will help the player establish what is known as "the running count".

If the dealer has a blackjack (21) he/she automatically wins the hand and will take away all of the chips that were placed as bets by the players unless another player also has blackjack in which case he/she will keep his/her bet. If the Dealer does not have a blackjack he/she must check to see if any of the players on the table do have a blackjack. If another player has a blackjack, the dealer will give that player 3 chips for every two chips played. Half chips are supplied with The Better Bettor Chips, in case an odd number of chips are being bet.

Once all of the blackjacks have been played the dealer will resume dealing to the player to his/her left. If the player chooses to take a card or "hit" the dealer will give them a card and if they want to keep the hand they have or "stand". The player can continue taking cards until he/she has cards which according to blackjack values exceeds 21 in which case the player "busts" and loses their bet. The dealer may then move clockwise to the next player and continue the same process until the dealer gets to their hand.

The player should continue counting every card (using the values written on the tops and bottoms of the cards) which are dealt from the shuffled pile so that they keep an accurate "running count". When the Dealer gets to their hand they will continue to take cards until they have what is known as a hard 17 (the value of 17 using blackjack values for cards without having an ace account for 11) or greater. If the dealer "busts" he/she will give each player the same amount of chips they have bet. If the dealer does not bust he/she will take away the chips of the players who have hands which according to blackjack rules are less points and give each player that have more points the same amount of chips which they bet. If the dealer and the player have the same amount of points according to blackjack rules then the player will keep his/her bet and this is known as a "push".

Once each hand is finished dealing the player will convert the "running count" to what is known as the "true count". This is done by taking the running count and dividing it into the amount of decks which have not been played. For example if 8 decks are being used and 2 have been dealt and the running count is +18. The Player will divide 6 (the remaining amount of decks not played) into 18 which gives you +3. The player will use the "true count" count to his or her advantage when betting by increasing his or her bet in accordance to the value of the true count and the amount of chips they have. Generally when the true count is 4 or greater the player will have greater chances of having higher value hands and/or a blackjack and should increase the amount of chips which they bet to take advantage of their position. The Dealer will continue dealing until all of the cards are dealt or the players run out of chips. At the end of the game, the present invention optionally includes counting each of the player's chips and the player with the most chips wins.

The inventions also includes counting or otherwise maintaining a dealer count value which indicates the number of consecutive bust or other dealer event jackpot hands dealt to the dealer. These dealer jackpot tally events can include a dealer bust hand or a dealer natural hand. Other dealer jackpot tally events are also possible. Alternatively, dealer events such as busts can be credited to the counts of players or used to offer increased jackpots for non-dealer players during the next consecutive hand or other subsequent play.

It will be apparent to one of skill in the art that described herein is a novel apparatus, system and method for teaching a card counting game. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

TABLE 1

| Game | Ace | 2 | 3 | 4 | 5 | 6 | 7 | 8 | 9 | 10 | Jack | Queen | King |
|---|---|---|---|---|---|---|---|---|---|---|---|---|---|
| Canfield Expert | 1D | 2A | 3A | 4A | 5A | 6A | 7C | 8A | 9B | 10C | 11C | 12C | 13C |
| Canfield Master | 1D | 2C | 3A | 4B | 5C | 6B | 7C | 8A | 9B | 10B | 11B | 12B | 13B |
| High-Low | 1C | 2C | 3A | 4A | 5A | 6A | 7A | 8A | 9D | 10C | 11C | 12C | 13C |
| Hi Option 1 | 1D | 2A | 3A | 4A | 5A | 6A | 7A | 8A | 9D | 10C | 11C | 12C | 13C |
| Hi Option 2 | 1D | 2C | 3A | 4B | 5C | 6A | 7C | 8A | 9D | 10B | 11B | 12B | 13B |
| Kiss 2 | 1D | 2E | 3A | 4A | 5A | 6A | 7A | 8A | 9D | 10C | 11C | 12C | 13C |
| Kiss 3 | 1C | 2E | 3A | 4A | 5A | 6A | 7C | 8A | 9D | 10C | 11C | 12C | 13C |
| K-O | 1C | 2C | 3A | 4A | 5A | 6A | 7C | 8A | 9D | 10C | 11C | 12C | 13C |
| Mentor | 1C | 2C | 3B | 4B | 5C | 6B | 7C | 8A | 9B | 10B | 11B | 12B | 13B |
| Omega 2 | 1D | 2A | 3B | 4B | 5C | 6B | 7C | 8A | 9B | 10B | 11B | 12B | 13B |
| Red 7 | 1C | 2C | 3A | 4A | 5A | 6A | 7E | 8A | 9D | 10C | 11C | 12C | 13C |
| REKO | 1C | 2C | 3A | 4A | 5A | 6A | 7C | 8A | 9D | 10C | 11C | 12C | 13C |
| Revere Plus-Minus | 1D | 2C | 3A | 4A | 5A | 6A | 7A | 8A | 9B | 10C | 11C | 12C | 13C |
| Revere Point Count | 1B | 2C | 3B | 4B | 5C | 6B | 7C | 8A | 9D | 10B | 11B | 12B | 13B |
| Revere RAPC | 1A | 2D | 3C | 4C | 5E | 6C | 7D | 8A | 9B | 10A | 11A | 12A | 13A |
| Revere 14 Count | 1D | 2D | 3B | 4C | 5E | 6B | 7C | 8A | 9A | 10A | 11A | 12A | 13A |
| Silver Fox | 1C | 2C | 3A | 4A | 5A | 6A | 7C | 8A | 9B | 10C | 11C | 12C | 13C |
| Unbalanced Zen 2 | 1C | 2C | 3B | 4B | 5C | 6B | 7C | 8A | 9D | 10B | 11B | 12B | 13B |
| Uston Advanced Plus-Minus | 1C | 2A | 3A | 4A | 5A | 6A | 7C | 8A | 9D | 10C | 11C | 12C | 13C |
| Uston APC | 1D | 2C | 3B | 4B | 5D | 6B | 7D | 8B | 9B | 10A | 11A | 12A | 13A |
| Uston SS | 1B | 2D | 3B | 4B | 5D | 6B | 7C | 8A | 9B | 10B | 11B | 12B | 13B |
| Wong Halves | 1C | 2B | 3A | 4A | 5B | 6A | 7B | 8A | 9C | 10C | 11C | 12C | 13C |
| Zen Count | 1C | 2C | 3A | 4B | 5C | 6B | 7C | 8A | 9D | 10B | 11B | 12B | 13B |

What is claimed is:

1. A system for teaching card counting, the system comprising:
   a plurality of sets of playing cards where each card in each set has a predetermined value, a set of playing cards selected from the plurality of sets of playing cards based upon a card counting system to be learned by a player selected from a plurality of card counting systems;
   where each card in the selected set of playing cards includes said predetermined value visually displayed in at least one form of alphanumeric characters or numbers, and the predetermined values are adapted to match the selected card counting system to be learned; and
   where each said predetermined value is visually displayed proximal to the suit and rank of each card.

2. The system for teaching card counting according to claim 1, where the predetermined values are selected from the group consisting of minus 3, minus, 2 minus 1, zero, plus 0.5, plus 1, plus 2, plus 3 and plus 4.

3. The system for teaching card counting according to claim 1 where the cards are substantially rectangular.

4. The system for teaching card counting according to claim 3, where each said predetermined value is visually displayed in at least two opposite corners of said card.

5. The system for teaching card counting according to claim 4, where each said predetermined value is displayed right side up on each short side of said rectangular playing card such that when a player viewing such card in a standard card playing position, the predetermined value can always be read right side up.

6. The system for teaching card counting according to claim 5, wherein a player is required to make a wager before being dealt a card.

7. The system for teaching card counting according to claim 6, wherein a player is required to make a wager after being dealt a card.

8. The system for teaching card counting according to claim 7 wherein said predetermined criteria comprises a predetermined successful outcome on at least one hand.

9. The system for teaching card counting according to claim 8, wherein said predetermined criteria comprises a predetermined unsuccessful outcome on at least one hand.

10. The system for teaching card counting according to claim 9, wherein said predetermined criteria comprises an amount wagered by a player.

11. The system for teaching card counting according to claim 10, wherein said predetermined criteria comprises an additional payment by at least one player.

12. The system for teaching card counting according to claim 11, wherein said predetermined criteria comprises at least some information from an unrelated game.

13. The system for teaching card counting according to claim 12, wherein said predetermined criteria comprises either a predetermined unsuccessful or successful outcome in at least one game.

* * * * *